United States Patent
Colgrove et al.

(10) Patent No.: US 8,645,664 B1
(45) Date of Patent: Feb. 4, 2014

(54) LOGICAL SECTOR MAPPING IN A FLASH STORAGE ARRAY

(75) Inventors: John Colgrove, Los Altos, CA (US); John Hayes, Mountain View, CA (US); Ethan Miller, Santa Cruz, CA (US); Feng Wang, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 224 days.

(21) Appl. No.: 13/289,765

(22) Filed: Nov. 4, 2011

Related U.S. Application Data

(63) Continuation of application No. 13/208,094, filed on Aug. 11, 2011.

(51) Int. Cl.
G06F 12/08 (2006.01)

(52) U.S. Cl.
USPC .............................. 711/206; 711/164; 711/208

(58) Field of Classification Search
None
See application file for complete search history.

(56) References Cited

U.S. PATENT DOCUMENTS

| | | | |
|---|---|---|---|
| 5,293,597 A * | 3/1994 | Jensen et al. ................... | 711/207 |
| 7,031,971 B1 | 4/2006 | Taillefer | |
| 7,139,892 B2 * | 11/2006 | Peinado et al. ................ | 711/163 |
| 7,620,772 B1 * | 11/2009 | Liikanen et al. ............... | 711/112 |
| 7,653,832 B2 | 1/2010 | Faibish et al. | |
| 7,711,923 B2 * | 5/2010 | Rogers et al. .................. | 711/206 |
| 7,802,063 B1 | 9/2010 | Chatterjee et al. | |
| 7,873,782 B2 | 1/2011 | Terry et al. | |
| 7,991,946 B2 | 8/2011 | Lee et al. | |
| 8,032,637 B2 | 10/2011 | Prince, Jr. et al. | |
| 8,041,907 B1 | 10/2011 | Wu et al. | |
| 8,041,924 B2 | 10/2011 | Strange et al. | |
| 2002/0087544 A1 | 7/2002 | Selkirk et al. | |
| 2007/0226723 A1 * | 9/2007 | Eichenberger et al. ........ | 717/159 |
| 2010/0153620 A1 | 6/2010 | Mckean et al. | |

FOREIGN PATENT DOCUMENTS

WO  9913403 A1  3/1999

* cited by examiner

*Primary Examiner* — Gary Portka
(74) *Attorney, Agent, or Firm* — Rory D. Rankin; Meyertons, Hood, Kivlin, Kowert & Goetzel, P.C.

(57) ABSTRACT

A system and method for efficiently performing user storage virtualization for data stored in a storage system including a plurality of solid-state storage devices. A data storage subsystem supports multiple mapping tables. Records within a mapping table are arranged in multiple levels. Each level stores pairs of a key value and a pointer value. The levels are sorted by time. New records are inserted in a created newest (youngest) level. No edits are performed in-place. All levels other than the youngest may be read only. The system may further include an overlay table which identifies those keys within the mapping table that are invalid.

20 Claims, 16 Drawing Sheets

LOGICAL SECTOR MAPPING IN A FLASH STORAGE ARRAY

CROSS-REFERENCE TO RELATED APPLICATIONS

This application is a continuation of U.S. patent application Ser. No. 13/208,094, entitled "Logical Sector Mapping In A Flash Storage Array", filed Aug. 11, 2011, the entirety of which is incorporated herein by reference.

BACKGROUND OF THE INVENTION

1. Field of the Invention

This invention relates to computer networks and, more particularly, to efficiently performing user storage virtualization for data stored among a plurality of solid-state storage devices.

2. Description of the Related Art

As computer memory storage and data bandwidth increase, so does the amount and complexity of data that businesses daily manage. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

The distributed storage system comprises physical volumes, which may be hard disks, solid-state devices, storage devices using another storage technology, or partitions of a storage device. Software applications, such as a logical volume manager or a disk array manager, provide a means of allocating space on mass-storage arrays. In addition, this software allows a system administrator to create units of storage groups including logical volumes. Storage virtualization provides an abstraction (separation) of logical storage from physical storage in order to access logical storage without end-users identifying physical storage.

To support storage virtualization, a volume manager performs input/output (I/O) redirection by translating incoming I/O requests using logical addresses from end-users into new requests using addresses associated with physical locations in the storage devices. As some storage devices may include additional address translation mechanisms, such as address translation layers which may be used in solid state storage devices, the translation from a logical address to another address mentioned above may not represent the only or final address translation. Redirection utilizes metadata stored in one or more mapping tables. In addition, information stored in one or more mapping tables may be used for storage deduplication and mapping virtual sectors at a specific snapshot level to physical locations. The volume manager may maintain a consistent view of mapping information for the virtualized storage. However, a supported address space may be limited by a storage capacity used to maintain a mapping table.

The technology and mechanisms associated with chosen storage disks determines the methods used by a volume manager. For example, a volume manager that provides mappings for a granularity level of a hard disk, a hard disk partition, or a logical unit number (LUN) of an external storage device is limited to redirecting, locating, removing duplicate data, and so forth, for large chunks of data. One example of another type of storage disk is a Solid-State Disk (SSD). An SSD may emulate a HDD interface, but an SSD utilizes solid-state memory to store persistent data rather than electromechanical devices as found in a HDD. For example, an SSD may comprise banks of Flash memory. Accordingly, a large supported address space by one or more mapping tables may not be achieved in systems comprising SSDs for storage while utilizing mapping table allocation algorithms developed for HDDs.

In view of the above, systems and methods for efficiently performing storage virtualization for data stored among a plurality of solid-state storage devices are desired.

SUMMARY OF THE INVENTION

Various embodiments of a computer system and methods for efficiently performing user storage virtualization for data stored among a plurality of solid-state storage devices are disclosed.

In one embodiment, a data storage subsystem coupled to a network receives read and write requests on the network from a client computer. The data storage subsystem comprises a plurality of data storage locations on a device group including a plurality of storage devices. The data storage subsystem further comprises at least one mapping table comprising a plurality of levels sorted by time. In one embodiment, each level stores one or more tuples, each of the tuples including one or more values that may be used as lookup keys. In addition, each of the tuples may include data values that are associated with the key values. In one embodiment, the mapping table is a virtual-to-physical address translation table. In another embodiment, the mapping table is a deduplication table. The data storage subsystem further comprises a data storage controller configured to create a new highest level (youngest level) to be added to the plurality of levels in response to detecting a condition for inserting one or more new tuples into the mapping table. Each tuple may be stored in a separate record, or entry, within the mapping table. The records may be sorted by key value.

Also contemplated are embodiments in which the system includes one or more "overlay" tables. An overlay table may be used to modify responses to queries answered by the mapped table. Modified responses can include marking responses invalid or modifiying field values in tuples provided in response to a query to the mapping table. Accesses to the overlay table may determine in a relatively quick manner that a given key is not valid. Also contemplated are embodiments wherein all levels of the mapping table, other than the youngest, are read only.

These and other embodiments will become apparent upon consideration of the following description and accompanying drawings.

Figure 1:
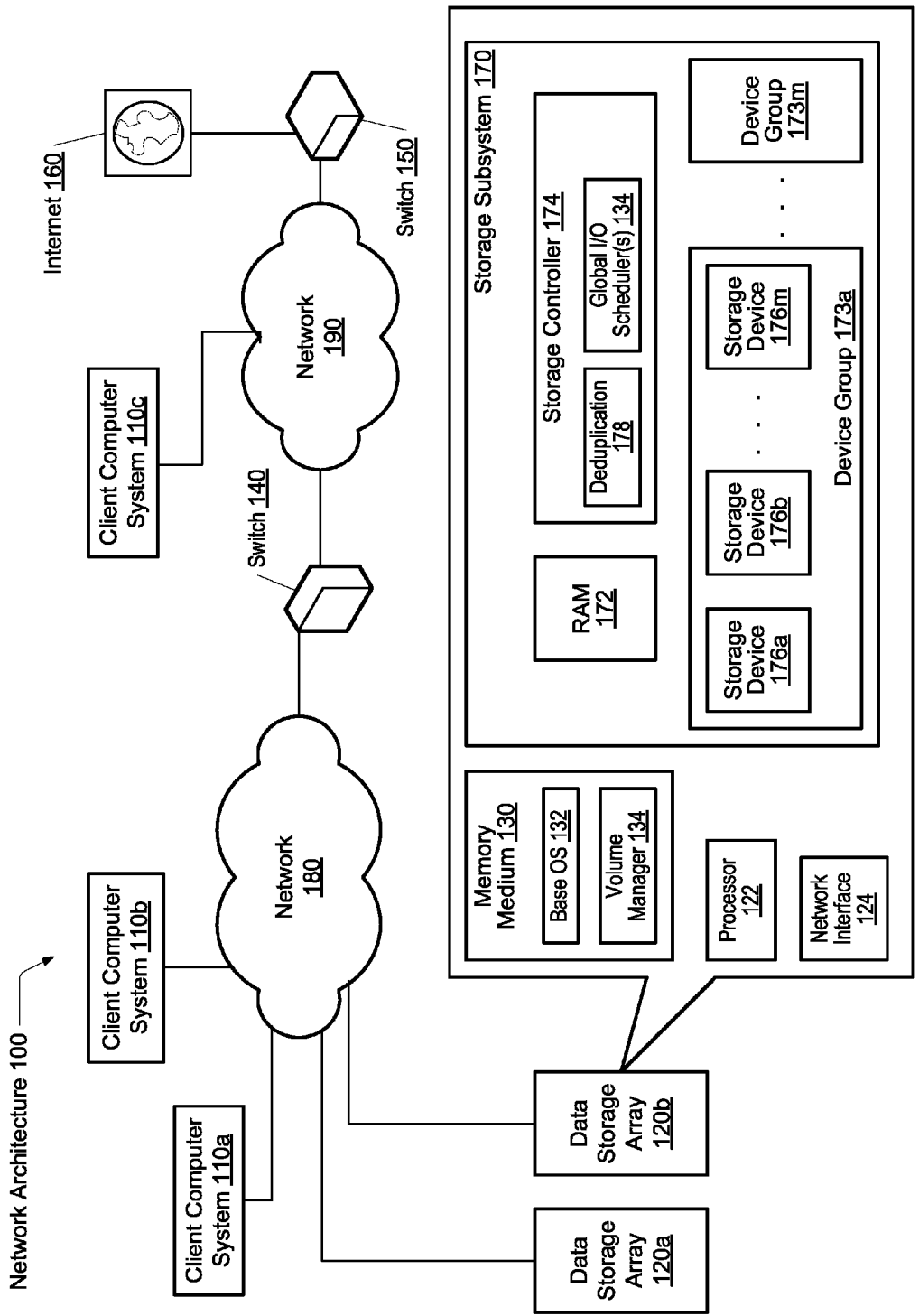
FIG. 1 is a generalized block diagram illustrating one embodiment of network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of a network architecture 100 is shown. As described further below, one embodiment of network architecture 100 includes client computer systems 110a-110b interconnected to one another through a network 180 and to data storage arrays 120a-120b. Network 180 may be coupled to a second network 190 through a switch 140. Client computer system 110c is coupled to client computer systems 110a-110b and data storage arrays 120a-120b via network 190. In addition, network 190 may be coupled to the Internet 160 or otherwise outside network through switch 150.

It is noted that in alternative embodiments, the number and type of client computers and servers, switches, networks, data storage arrays, and data storage devices is not limited to those shown in FIG. 1. At various times one or more clients may operate offline. In addition, during operation, individual client computer connection types may change as users connect, disconnect, and reconnect to network architecture 100. Further, while the present description generally discusses network attached storage, the systems and methods described herein may also be applied to directly attached storage systems and may include a host operating system configured to perform one or more aspects of the described methods. Numerous such alternatives are possible and are contemplated. A further description of each of the components shown in FIG. 1 is provided shortly. First, an overview of some of the features provided by the data storage arrays 120a-120b is described.

In the network architecture 100, each of the data storage arrays 120a-120b may be used for the sharing of data among different servers and computers, such as client computer systems 110a-110c. In addition, the data storage arrays 120a-120b may be used for disk mirroring, backup and restore, archival and retrieval of archived data, and data migration from one storage device to another. In an alternate embodiment, one or more client computer systems 110a-110c may be linked to one another through fast local area networks (LANs) in order to form a cluster. Such clients may share a storage resource, such as a cluster shared volume residing within one of data storage arrays 120a-120b.

Each of the data storage arrays 120a-120b includes a storage subsystem 170 for data storage. Storage subsystem 170 may comprise a plurality of storage devices 176a-176m. These storage devices 176a-176m may provide data storage services to client computer systems 110a-110c. Each of the storage devices 176a-176m uses a particular technology and mechanism for performing data storage. The type of technology and mechanism used within each of the storage devices 176a-176m may at least in part be used to determine the algorithms used for controlling and scheduling read and write operations to and from each of the storage devices 176a-176m. For example, the algorithms may locate particular physical locations corresponding to the operations. In addition, the algorithms may perform input/output (I/O) redirection for the operations, removal of duplicate data in the storage subsystem 170, and support one or more mapping tables used for address redirection and deduplication.

The logic used in the above algorithms may be included in one or more of a base operating system (OS) 132, a volume manager 134, within a storage subsystem controller 174, control logic within each of the storage devices 176a-176m, or otherwise. Additionally, the logic, algorithms, and control mechanisms described herein may comprise hardware and/or software.

Each of the storage devices 176a-176m may be configured to receive read and write requests and comprise a plurality of data storage locations, each data storage location being addressable as rows and columns in an array. In one embodiment, the data storage locations within the storage devices 176a-176m may be arranged into logical, redundant storage containers or RAID arrays (redundant arrays of inexpensive/independent disks).

In some embodiments, each of the storage devices 176a-176m may utilize technology for data storage that is different from a conventional hard disk drive (HDD). For example, one or more of the storage devices 176a-176m may include or be further coupled to storage consisting of solid-state memory to store persistent data. In other embodiments, one or more of the storage devices 176a-176m may include or be further coupled to storage using other technologies such as spin torque transfer technique, magnetoresistive random access memory (MRAM) technique, shingled disks, memristors, phase change memory, or other storage technologies. These different storage techniques and technologies may lead to differing I/O characteristics between storage devices.

In one embodiment, the included solid-state memory comprises solid-state drive (SSD) technology. The differences in technology and mechanisms between HDD technology and SDD technology may lead to differences in input/output (I/O) characteristics of the data storage devices 176a-176m. A Solid-State Disk (SSD) may also be referred to as a Solid-State Drive. Without moving parts or mechanical delays, an SSD may have a lower read access time and latency than a HDD. However, the write performance of SSDs is generally slower than the read performance and may be significantly impacted by the availability of free, programmable blocks within the SSD.

Storage array efficiency may be improved by creating a storage virtualization layer between user storage and physical locations within storage devices 176a-176m. In one embodiment, a virtual layer of a volume manager is placed in a device-driver stack of an operating system (OS), rather than within storage devices or in a network. Many storage arrays perform storage virtualization at a coarse-grained level to allow storing of virtual-to-physical mapping tables entirely in memory. However, such storage arrays are unable to integrate features such as data compression, deduplication and copy-on-modify operations. Many file systems support fine-grained virtual-to-physical mapping tables, but they do not support large storage arrays, such as device groups 173a-173m. Rather, a volume manager or a disk array manager is used to support device groups 173a-173m.

In one embodiment, one or more mapping tables may be stored in the storage devices 176a-176m, rather than memory, such as RAM 172, memory medium 130 or a cache within processor 122. The storage devices 176a-176 may be SSDs utilizing Flash memory. The low read access and latency times for SSDs may allow a small number of dependent read operations to occur while servicing a storage access request from a client computer. The dependent read operations may be used to access one or more indexes, one or more mapping tables, and user data during the servicing of the storage access request.

In one example, I/O redirection may be performed by the dependent read operations. In another example, inline deduplication may be performed by the dependent read operations. In yet another example, bulk array tasks, such as a large copy, move, or zeroing operation, may be performed entirely within a mapping table rather than accessing storage locations holding user data. Such a direct map manipulation may greatly reduce I/O traffic and data movement within the storage devices 176a-176m. The combined time for both servicing the storage access request and performing the dependent read operations from SSDs may be less than servicing a storage access request from a spinning HDD.

In addition, the information within a mapping table may be compressed. A particular compression algorithm may be chosen to allow identification of individual components, such as a key within a record among multiple records. Therefore, a search for a given key among multiple compressed records may occur. If a match is found, only the matching record may be decompressed. Compressing the tuples within records of a mapping table may further enable fine-grained level mapping. This fine-grained level mapping may allow direct map manipulation as an alternative to common bulk array tasks. Further details concerning efficient storage virtualization will be discussed below.

Again, as shown, network architecture 100 includes client computer systems 110a-110c interconnected through networks 180 and 190 to one another and to data storage arrays 120a-120b. Networks 180 and 190 may include a variety of techniques including wireless connection, direct local area network (LAN) connections, wide area network (WAN) connections such as the Internet, a router, storage area network, Ethernet, and others. Networks 180 and 190 may comprise one or more LANs that may also be wireless. Networks 180 and 190 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 180 and 190. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110a-110c are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 110a-110c include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Each processor core and memory hierarchy within a client computer system may be connected to a network interface. In addition to hardware components, each of the client computer systems 110a-110c may include a base operating system (OS) stored within the memory hierarchy. The base OS may be representative of any of a variety of operating systems, such as, for example, MS-DOS®, MS-WINDOWS®, OS/2®, UNIX®, Linux®, Solaris®, AIX®, DART, or otherwise. As such, the base OS may be operable to provide various services to the end-user and provide a software framework operable to support the execution of various programs. Additionally, each of the client computer systems 110a-110c may include a hypervisor used to support virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources and access to logical storage entities (e.g., LUNs) built upon the storage devices 176a-176m within each of the data storage arrays 120a-120b.

Each of the data storage arrays 120a-120b may be used for the sharing of data among different servers, such as the client computer systems 110a-110c. Each of the data storage arrays 120a-120b includes a storage subsystem 170 for data storage. Storage subsystem 170 may comprise a plurality of storage devices 176a-176m. Each of these storage devices 176a-176m may be an SSD. A controller 174 may comprise logic for handling received read/write requests. A random-access memory (RAM) 172 may be used to batch operations, such as received write requests. In various embodiments, when batching write operations (or other operations) non-volatile storage (e.g., NVRAM) may be used.

The base OS 132, the volume manager 134 (or disk array manager 134), any OS drivers (not shown) and other software stored in memory medium 130 may provide functionality providing access to files and the management of these functionalities. The base OS 132 may be a storage operating system such as NetApp Data ONTAP® or otherwise. The base OS 132 and the OS drivers may comprise program instructions stored on the memory medium 130 and executable by processor 122 to perform one or more memory access operations in storage subsystem 170 that correspond to received requests. The system shown in FIG. 1 may generally include one or more file servers and/or block servers.

Each of the data storage arrays 120a-120b may use a network interface 124 to connect to network 180. Similar to client computer systems 110a-110c, in one embodiment, the functionality of network interface 124 may be included on a network adapter card. The functionality of network interface 124 may be implemented using both hardware and software. Both a random-access memory (RAM) and a read-only memory (ROM) may be included on a network card implementation of network interface 124. One or more application specific integrated circuits (ASICs) may be used to provide the functionality of network interface 124.

In addition to the above, each of the storage controllers 174 within the data storage arrays 120a-120b may support storage array functions such as snapshots, replication and high availability. In addition, each of the storage controllers 174 may support a virtual machine environment that comprises a plurality of volumes with each volume including a plurality of snapshots. In one example, a storage controller 174 may support hundreds of thousands of volumes, wherein each volume includes thousands of snapshots. In one embodiment, a volume may be mapped in fixed-size sectors, such as a 4-kilobyte (KB) page within storage devices 176a-176m. In another embodiment, a volume may be mapped in variable-size sectors such as for write requests. A volume ID, a snapshot ID, and a sector number may be used to identify a given volume.

An address translation table may comprise a plurality of entries, wherein each entry holds a virtual-to-physical mapping for a corresponding data component. This mapping table may be used to map logical read/write requests from each of the client computer systems 110a-110c to physical locations in storage devices 176a-176m. A "physical" pointer value may be read from the mapping table during a lookup operation corresponding to a received read/write request. This physical pointer value may then be used to locate a physical location within the storage devices 176a-176m. It is noted the physical pointer value may be used to access another mapping table within a given storage device of the storage devices 176a-176m. Consequently, one or more levels of indirection may exist between the physical pointer value and a target storage location.

In another embodiment, the mapping table may comprise information used to deduplicate data (deduplication table related information). The information stored in the deduplication table may include mappings between one or more calculated hash values for a given data component and a physical pointer to a physical location in one of the storage devices 176a-176m holding the given data component. In addition, a length of the given data component and status information for a corresponding entry may be stored in the deduplication table.

Figure 2:
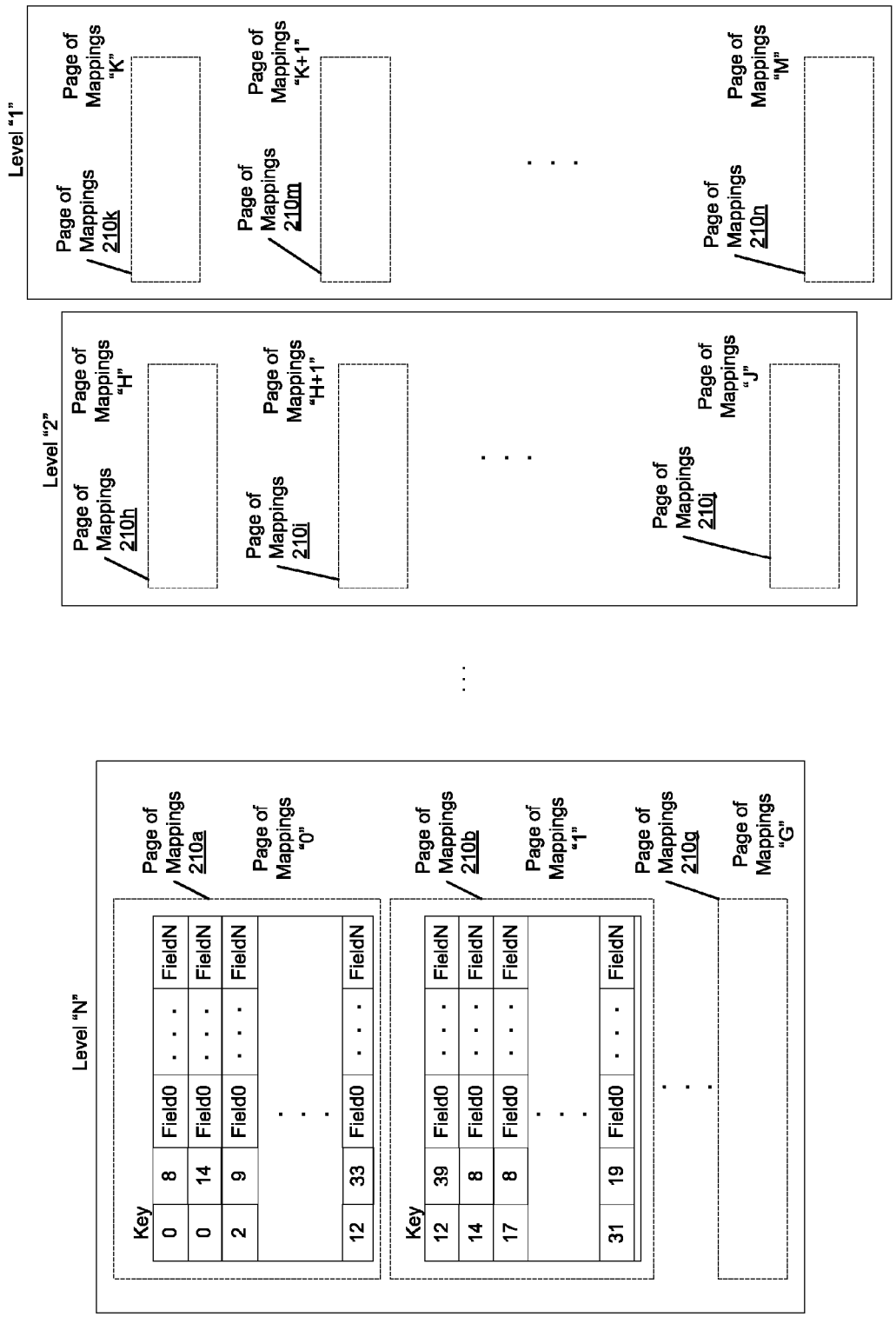
FIG. 2 is a generalized block diagram of one embodiment of a mapping table.

Turning now to FIG. 2, a generalized block diagram of one embodiment of a mapping table is shown. As discussed earlier, one or more mapping tables may be used for I/O redirection or translation, deduplication of duplicate copies of user data, volume snapshot mappings, and so forth. Mapping tables may be stored in the storage devices 176a-176m. The diagram shown in FIG. 2 represents a logical representation of one embodiment of the organization and storage of the mapping table. Each level shown may include mapping table entries corresponding to a different period of time. For example, level "1" may include information older than information stored in level "2". Similarly, level "2" may include information older than information stored in level "3". The information stored in the records, pages and levels shown in FIG. 2 may be stored in a random-access manner within the storage devices 176a-176m. Additionally, copies of portions or all of a given mapping table entries may be stored in RAM 172, in buffers within controller 174, in memory medium 130, and in one or more caches within or coupled to processor 122. In various embodiments, a corresponding index may be included in each level for mappings which are part of the level (as depicted later in FIG. 4). Such an index may include an identification of mapping table entries and where they are stored (e.g., an identification of the page) within the level. In other embodiments, the index associated with mapping table entries may be a distinct entity, or entities, which are not logically part of the levels themselves.

Generally speaking, each mapping table comprises a set of rows and columns. A single record may be stored in a mapping table as a row. A record may also be referred to as an entry. In one embodiment, a record stores at least one tuple including a key. Tuples may (or may not) also include data fields including data such as a pointer used to identify or locate data components stored in storage subsystem 170. It is noted that in various embodiments, the storage subsystem may include storage devices (e.g., SSDs) which have internal mapping mechanisms. In such embodiments, the pointer in the tuple may not be an actual physical address per se. Rather, the pointer may be a logical address which the storage device maps to a physical location within the device. Over time, this internal mapping between logical address and physical location may change. In other embodiments, records in the mapping table may only contain key fields with no additional associated data fields. Attributes associated with a data component corresponding to a given record may be stored in columns, or fields, in the table. Status information, such as a valid indicator, a data age, a data size, and so forth, may be stored in fields, such as Field0 to FieldN shown in FIG. 2. In various embodiments, each column stores information corresponding to a given type. In some embodiments, compression techniques may be utilized for selected fields which in some cases may result in fields whose compressed representation is zero bits in length.

A key is an entity in a mapping table that may distinguish one row of data from another row. Each row may also be referred to as an entry or a record. A key may be a single column, or it may consist of a group of columns used to identify a record. In one example, an address translation mapping table may utilize a key comprising a volume identifier (ID), a logical or virtual address, a snapshot ID, a sector number, and so forth. A given received read/write storage access request may identify a particular volume, sector and length. A sector may be a logical block of data stored in a volume. Sectors may have different sizes on different volumes. The address translation mapping table may map a volume in sector-size units.

A volume identifier (ID) may be used to access a volume table that conveys a volume ID and a corresponding current snapshot ID. This information along with the received sector number may be used to access the address translation mapping table. Therefore, in such an embodiment, the key value for accessing the address translation mapping table is the combination of the volume ID, snapshot ID, and the received sector number. In one embodiment, the records within the address translation mapping table are sorted by volume ID, followed by the sector number and then by the snapshot ID. This ordering may group together different versions of data components in different snapshots. Therefore, during a lookup for a storage access read request, a corresponding data component may be found with fewer read operations to the storage devices 176a-176m.

The address translation mapping table may convey a physical pointer value that indicates a location within the data storage subsystem 170 storing a data component corresponding to the received data storage access request. The key value may be compared to one or more key values stored in the mapping table. In the illustrated example, simpler key values, such as "0", "2", "12" and so forth, are shown for ease of illustration. The physical pointer value may be stored in one or more of the fields in a corresponding record.

The physical pointer value may include a segment identifier (ID) and a physical address identifying the location of storage. A segment may be a basic unit of allocation in each of the storage devices 176a-176m. A segment may have a redundant array of independent device (RAID) level and a data type. During allocation, a segment may have one or more of the storage devices 176a-176m selected for corresponding storage. In one embodiment, a segment may be allocated an equal amount of storage space on each of the one or more selected storage devices of the storage devices 176a-176m. The data storage access request may correspond to multiple sectors, which may result in multiple parallel lookups. A write request may be placed in an NVRAM buffer, such as RAM 172, and a write completion acknowledgment may be sent to a corresponding client computer of the client computers 110a-110c. At a later time, an asynchronous process may flush the buffered write requests to the storage devices 176a-176m.

In another example, the mapping table shown in FIG. 2 may be a deduplication table. A deduplication table may utilize a key comprising a hash value determined from a data component associated with a storage access request. The initial steps of a deduplication operation may be performed concurrently with other operations, such as a read/write request, a garbage collection operation, a trim operation, and so forth. For a given write request, the data sent from one of the client computer systems 110a-110c may be a data stream, such as a byte stream. As is well known to those skilled in the art, a data stream may be divided into a sequence of fixed-length or variable-length chunks. A chunking algorithm may perform the dividing of the data stream into discrete data components which may be referred to as "chunks". A chunk may be a sub-file content-addressable unit of data. In various embodiments, a table or other structure may be used to determine a particular chunking algorithm to use for a given file type or type of data. A file's type may be determined by referring to its file name extension, separate identifying information, the content of the data itself, or otherwise. The resulting chunks may then be stored in one of the data storage arrays 120a-120b to allow for sharing of the chunks. Such chunks may be stored separately or grouped together in various ways.

In various embodiments, the chunks may be represented by a data structure that allows reconstruction of a larger data component from its chunks (e.g. a particular file may be reconstructed based on one or more smaller chunks of stored data). A corresponding data structure may record its corresponding chunks including an associated calculated hash value, a pointer (physical and/or logical) to its location in one of the data storage arrays 120a-120b, and its length. For each data component, a deduplication application may be used to calculate a corresponding hash value. For example, a hash function, such as Message-Digest algorithm 5 (MD5), Secure Hash Algorithm (SHA), or otherwise, may be used to calculate a corresponding hash value. In order to know if a given data component corresponding to a received write request is already stored in one of the data storage arrays 120a-120b, bits of the calculated hash value (or a subset of bits of the hash value) for the given data component may be compared to bits in the hash values of data components stored in one or more of the data storage arrays 120a-120b.

A mapping table may comprise one or more levels as shown in FIG. 2. A mapping table may comprise 16 to 64 levels, although another number of levels supported within a mapping table is possible and contemplated. In FIG. 2, three levels labeled Level "1", Level "2" and Level "N" are shown for ease of illustration. Each level within a mapping table may include one or more partitions. In one embodiment, each partition is a 4 kilo-byte (KB) page. For example, Level "N" is shown to comprise pages 210a-210g, Level "2" comprises pages 210h-210j and Level "1" comprises pages 210k-210n. It is possible and contemplated other partition sizes may also be chosen for each of the levels within a mapping table. In addition, it is possible one or more levels have a single partition, which is the level itself.

In one embodiment, multiple levels within a mapping table are sorted by time. For example, in FIG. 2, Level "1" may be older than Level "2". Similarly, Level "2" may be older than Level "N". In one embodiment, when a condition for inserting one or more new records in the mapping table is detected, a new level may be created. In various embodiments, when a new level is created the number/designation given to the new level is greater than numbers given to levels that preceded the new level in time. For example, if the most recent level created is assigned the value 8, then a newly created level may be assigned the value 9. In this manner a temporal relationship between the levels may be established or determined. As may be appreciated, numerical values need not be strictly sequential. Additionally, alternative embodiments may reverse the numbering scheme such that newer levels have smaller numerical designations. Further, other embodiments may utilize non-numerical designations to distinguish between levels. Numerous such embodiments are possible and are contemplated. Each next older level has a label decremented by one from a label integer value of a previous younger level. A separate table not shown may be used to logically describe the mapping table. For example, each entry of the separate table may include a given level ID and a list of the page IDs stored within the given level ID.

By creating a new highest level for an insertion of new records, the mapping table is updated by appending the new records. In one embodiment, a single level is created as a new highest level and each of the new records is inserted into the single level. In another embodiment, the new records may be searched for duplicate keys prior to insertion into the mapping table. A single level may be created as a new highest level. When a given record storing a duplicate key is found, each of the records buffered ahead of the given record may be inserted into the single level. The new records may be buffered in a manner to preserve memory ordering, such as in-order completion of requests. Then another single level may be created and the remainder of the new records may be inserted into this other single level unless another record storing a duplicate key is found. If such a record is found, then the steps are repeated. Existing records within the mapping table storing a same key value as one of the new records are not edited or overwritten in-place by the insertion of the new records.

Although the sizes of the levels are illustrated as increasing with lower levels being larger than newer levels, the higher levels may alternate between being larger or smaller than neighboring levels. The number of newer records to insert into the mapping table may vary over time and create the fluctuating level sizes. The lower levels may be larger than newer levels due to flattening of the lower levels. Two or more lower levels may be flattened into a single level when particular conditions are detected. Further details are provided later.

With no edits in-place for the records stored in the mapping table, newer records placed in higher levels may override records storing a same key value located in the lower levels. For example, when the mapping table is accessed by a given key value, one or more levels may be found to store a record holding a key value matching the given key value. In such a case, the highest level of the one or more levels may be chosen to provide the information stored in its corresponding record as a result of the access. Further details are provided later. In addition, further details about the detected conditions for inserting one or more new records into the mapping table and the storage of information are provided later.

In one embodiment, entries within a given page may be sorted by key. For example, the entries may be sorted in ascending order according to a key included in the entry. Additionally, in various embodiments, the pages within a level may be sorted according to any desired sort order. In various embodiments, the pages within a level may also be sorted (e.g., according to key values or otherwise). In the example of FIG. 2, page 210a of Level N includes records sorted according to key value in ascending order. In various embodiments, one or more columns may be used to store key values. In the example of FIG. 2, two columns or fields are shown in each tuple for storing key values. Utilizing such key values, the records then may be sorted in a desired order. Sorting may be performed based on any of the key values for a records, or any combination of key values for the record. In the example shown, the first record stores a key value including 0 and 8 stored in two columns, and the last record stores a key value including 12 and 33. In this illustrated example, each sorted record in page 210a between the first and the last record stores a key value between 0 and 12 in the first column and the records are arranged in a manner to store key values based (at least in part) on the first column in an ascending order from 0 to 12. Similarly, page 210b includes sorted records, wherein the first record stores key values of 12 and 39 and the last record stores key values of 31 and 19. In this illustrated example, each sorted record in page 210b between the first and the last record stores a key value between 12 and 31 in the first column and the records are arranged in a manner to store key values in an ascending order from 12 to 31.

In addition to the above, the pages within Level N are sorted according to a desired order. In various embodiments, pages within a level may be sorted in a manner that reflects the order in which entries within a page are sorted. For example, pages within a level may be sorted according to key values in ascending order. As the first key value in page 210b is greater than the last key value in page 210a, page 210b follows page 210a in the sort order. Page 210g would then include entries whose key values are greater than those included in pages 210a-210f (not shown). In this manner, all entries within a level are sorted according to a common scheme. The entries are simply subdivided into page, or other, size units. As may be appreciated, other sorting schemes may be used as desired.

Figure 3A:
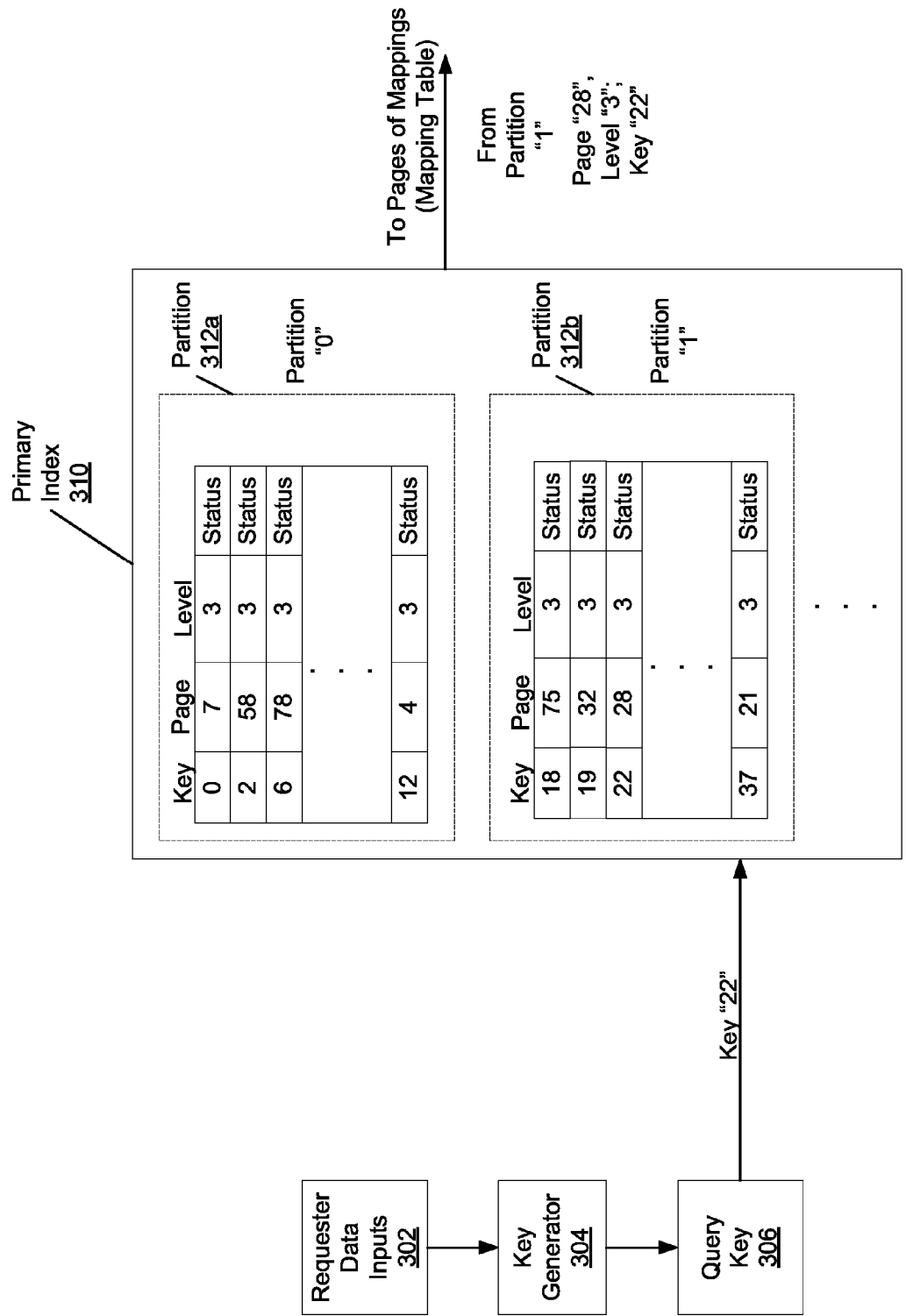
FIG. 3A is a generalized block diagram of one embodiment of a primary index used to access a mapping table.

Referring now to FIG. 3A, a generalized block diagram of one embodiment of a primary index used to access a mapping table is shown. A key generator 304 may receive one or more requester data inputs 302. In one embodiment, a mapping table is an address translation directory table. A given received read/write request may identify a particular volume, sector and length. The key generator 304 may produce a query key value 306 that includes a volume identifier (ID), a logical or virtual address, a snapshot ID, and a sector number. Other combinations are possible and other or additional values may be utilized as well. Different portions of the query key value 306 may be compared to values stored in columns that may or may not be contiguous within the mapping table. In the shown example, a key value of "22" is used for ease of illustration.

As described earlier, both a chunking algorithm and/or a segmenting algorithm associated with the key generator 304 may receive data 302 corresponding to a storage access request. These algorithms may produce one or more data components and select a hash function to calculate a corresponding hash value, or query key value 306, for each data component. The resulting hash value may be used to index the deduplication table.

A primary index 310, as shown in FIG. 3A, may provide location identifying information for data stored in the storage devices 176a-176m. For example, referring again to FIG. 2, a corresponding primary index 310 (or portion thereof) may be logically included in each of level "1", level "2" and level "N". Again, each level and each corresponding primary index may be physically stored in a random-access manner within the storage devices 176a-176m.

In one embodiment, the primary index 310 may be divided into partitions, such as partitions 312a-312b. In one embodiment, the size of the partitions may range from a 4 kilobyte (KB) page to 256 KB, though other sizes are possible and are contemplated. Each entry of the primary index 310 may store a key value. In addition, each entry may store a corresponding unique virtual page identifier (ID) and a level ID corresponding to the key value. Each entry may store corresponding status information such as validity information. When the primary index 310 is accessed with a query key value, the entries within the index 310 may be searched for one or more entries which match, or otherwise correspond to, the key value. Information from the matching entry may then be used to locate and retrieve a mapping which identifies a storage location which is the target of a received read or write request. In other words, the index 310 identifies the locations of mappings. In one embodiment, a hit in the index provides a corresponding page ID identifying a page within the storage devices 176a-176m storing both the key value and a corresponding physical pointer value. The page identified by the corresponding page ID may be searched with the key value to find the physical pointer value.

In the example of FIG. 3A, a received request corresponds to a key "22". This key is then used to access index 310. A search of the index 310 results on a hit to an entry within partition 312b. The matching entry in this case include information such as—page 28, and level 3. Based upon this result, the desired mapping for the request is found in a page identified as page 28 within level 3 of the mapping tables. Using this information, an access may then be made to the mapping tables to retrieve the desired mapping. If an access to the primary index 310 requires an access to storage, then at least two storage accesses would be required in order to obtain a desired mapping. Therefore, in various embodiments as described below, portions of the primary index are cached, or otherwise stored in a relatively fast access memory, in order to eliminate one access to the storage devices. In various embodiments, the entire primary index for the mapping tables is cached. In some embodiments, where the primary index has become too large to cache in its entirety, or is otherwise larger than desired, secondary, tertiary, or other index portions may be used in the cache to reduce its size. Secondary type indices are discussed below. In addition to the above, in various embodiments mapping pages corresponding to recent hits are also cached for at least some period of time. In this manner, processes which exhibit accesses with temporal locality can be serviced more rapidly (i.e., recently accessed locations will have their mappings cached and readily available).

Figure 3B:
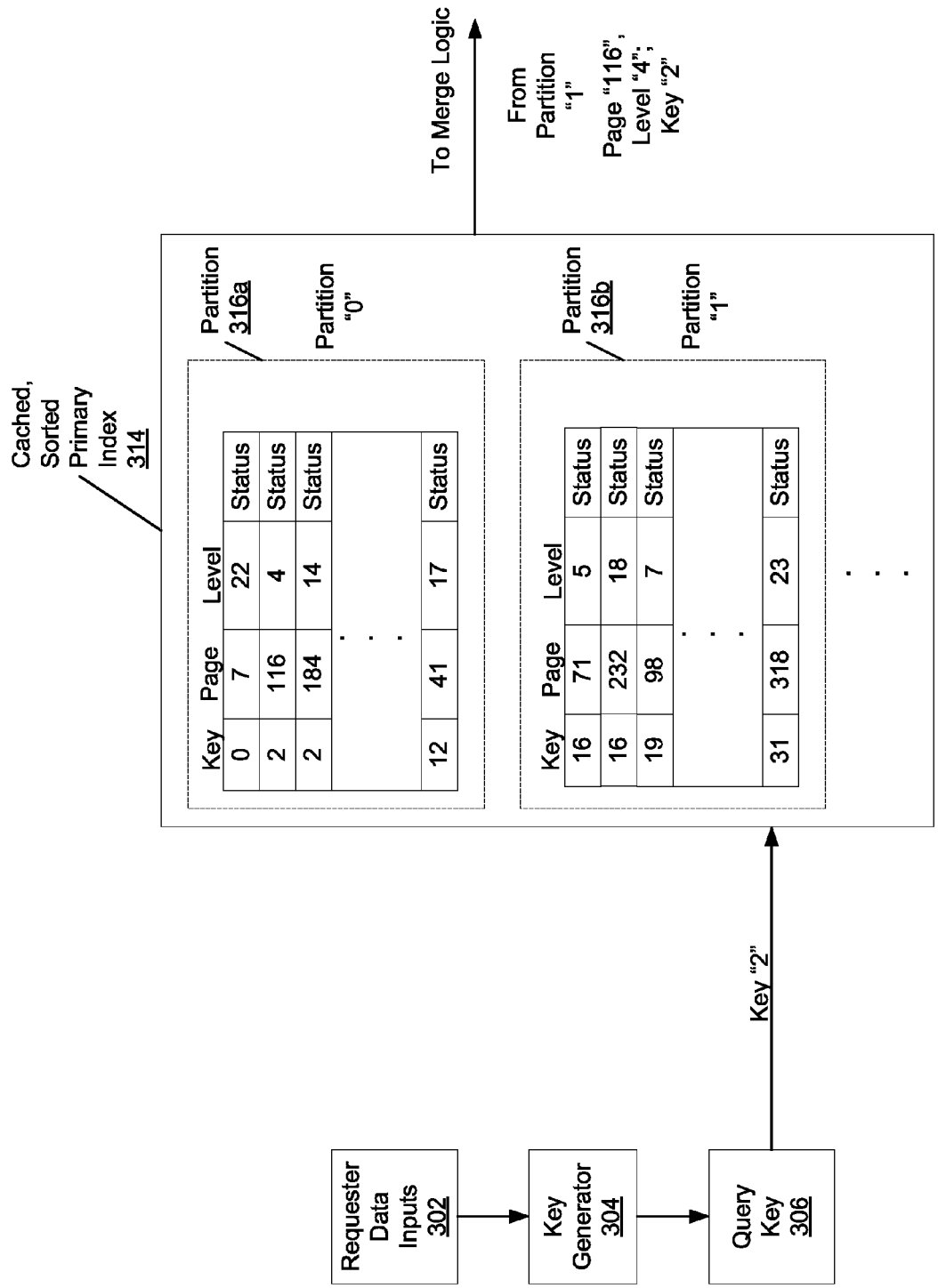
FIG. 3B is a generalized block diagram of another embodiment of a primary index used to access a mapping table.

Referring now to FIG. 3B, a generalized block diagram of one embodiment of a cached primary index used to access a mapping table is shown. Circuit and logic portions corresponding to those of FIG. 3A are numbered identically. The cached primary index 314 may include copies of information stored in each of the primary indexes 310 for the multiple levels in a mapping table. The primary index 314 may be stored in one or more of RAM 172, buffers within controller 174, memory medium 130 and caches within processor 122. In one embodiment, the primary index 314 may be sorted by key value, though sorting otherwise is possible. The primary index 314 may also be divided into partitions, such as partitions 316a-316b. In one embodiment, the size of the partitions 316a-316b may be a same size as the partitions 312a-312b within the primary index 310.

Similar to the primary index 310, each entry of the primary index 314 may store one or more of a key value, a corresponding unique virtual page identifier (ID), a level ID corresponding to the key value, and status information such as valid information. When the primary index 314 is accessed with a query key value 306, it may convey a corresponding page ID identifying a page within the storage devices 176a-176m storing both the key value and a corresponding pointer value. The page identified by the corresponding page ID may be searched with the key value to find the pointer value. As shown, the primary index 314 may have multiple records storing a same key value. Therefore, multiple hits may result from the search for a given key value. In one embodiment, a hit with a highest value of a level ID (or whatever indicator is used to identify a youngest level or most recent entry) may be chosen. This selection of one hit from multiple hits may be performed by merge logic not shown here. A further description of the merge logic is provided later.

Figure 4:
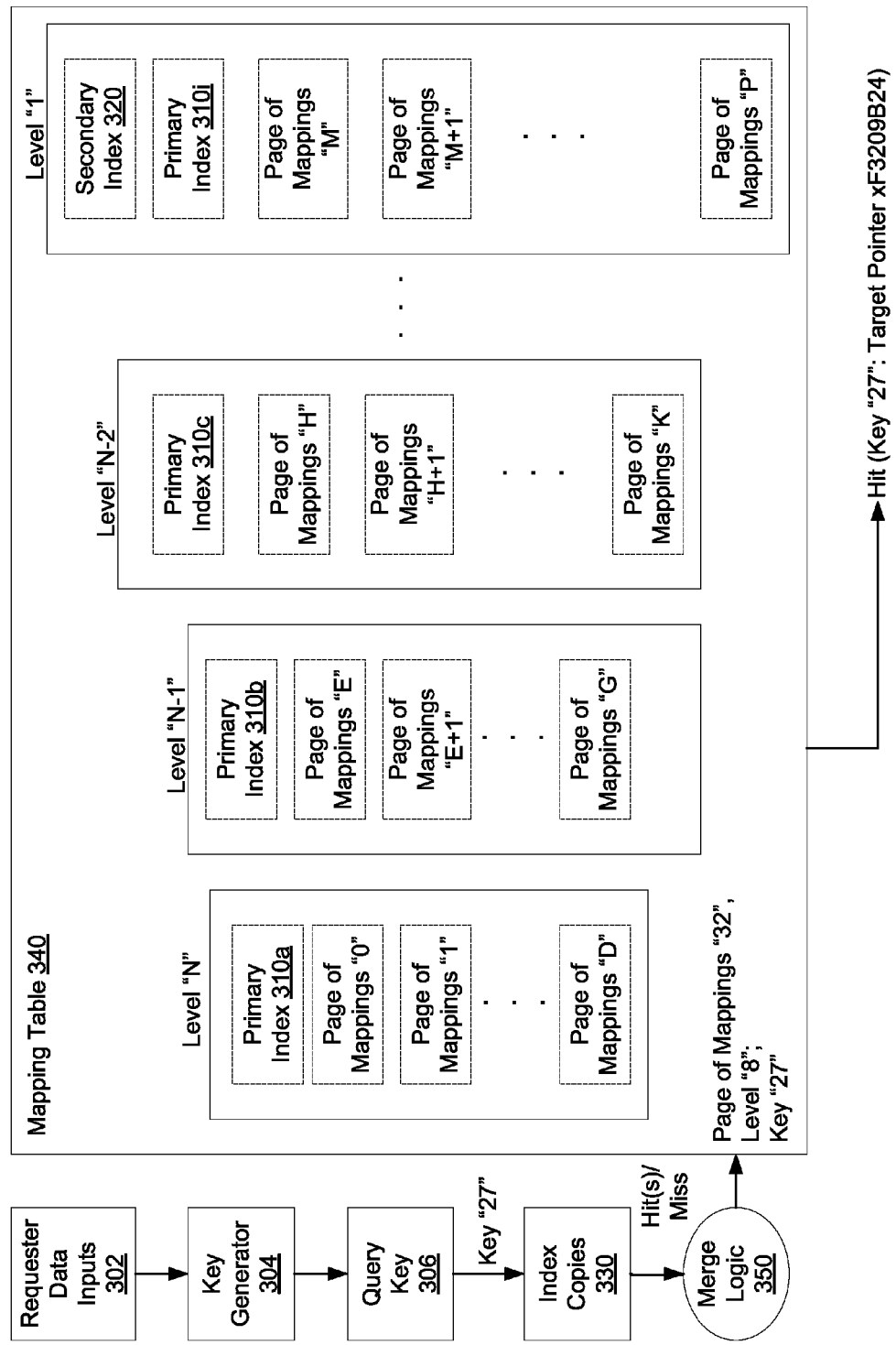
FIG. 4 is a generalized block diagram of another embodiment of a primary index and mapping table.

Turning now to FIG. 4, a generalized block diagram of another embodiment of a mapping table and primary index used to access the mapping table is shown. Circuit and logic portions corresponding to those of FIG. 3A are numbered identically. Mapping table 340 may have a similar structure as the mapping table shown in FIG. 2. However, storage of a corresponding primary index 310 for each level is now shown. A copy of one or more of the primary index portions 310a-310i may be included in index copies 330 (e.g., cached copies). Copies 330 may generally correspond to the cached index depicted in FIG. 3B. The information in index copies 330 may be stored in RAM 172, buffers within controller 174, memory medium 130, and caches within processor 122. In the embodiment shown, the information in primary indexes 310a-310i may be stored with the pages of mappings in storage devices 176a-176m. Also shown is a secondary index 320 which may be used to access a primary index, such as primary index 310i shown in the diagram. Similarly, accessing and updating the mapping table 340 may occur as described earlier.

Mapping table 340 comprises multiple levels, such as Level "1" to Level "N". In the illustrated example, each of the levels includes multiple pages. Level "N" is shown to include pages "0" to "D", Level N-1 includes pages "E" to "G", and so forth. Again, the levels within the mapping table 310 may be sorted by time. Level "N" may be younger than Level "N-1" and so forth. Mapping table 340 may be accessed by at least a key value. In the illustrated example, mapping table 340 is accessed by a key value "27" and a page ID "32". For example, in one embodiment, a level ID "8" may be used to identify a particular level (or "subtable") of the mapping table 340 to search. Having identified the desired subtable, the page ID may then be used to identify the desired page within the subtable. Finally, the key may be used to identify the desired entry within the desired page.

As discussed above, an access to the cached index 330 may result in multiple hits. In one embodiment, the results of these multiple hits are provided to merge logic 350 which identifies which hit is used to access the mapping table 340. Merge logic 350 may represent hardware and/or software which is included within a storage controller. In one embodiment, merge logic 350 is configured to identify a hit which corresponds to a most recent (newest) mapping. Such an identification could be based upon an identification of a corresponding level for an entry, or otherwise. In the example shown, a query corresponding to level 8, page 32, key 27 is received. Responsive to the query, page 32 of level 8 is accessed. If the key 27 is found within page 32 (a hit), then a corresponding result is returned (e.g., pointer xF3209B24 in the example shown). If the key 27 is not found within page 32, then a miss indication is returned. This physical pointer value may be output from the mapping table 340 to service a storage access request corresponding to the key value "27".

In one embodiment, the mapping table 340 supports inline mappings. For example, a mapping detected to have a sufficiently small target may be represented without an actual physical sector storing user data within the storage devices 176a-176m. One example may be a repeating pattern within the user data. Rather than actually store multiple copies of a repeated pattern (e.g., a series of zeroes) as user data within the storage devices 176a-176m, a corresponding mapping may have an indication marked in the status information, such as within one of the fields of field0 to fieldN in the mapping table, that indicates what data value is to be returned for a read request. However, there is no actual storage of this user data at a target location within the storage devices 176a-176m. Additionally, an indication may be stored within the status information of the primary index 310 and any additional indexes that may be used (not shown here).

In addition to the above, in various embodiments the storage system may simultaneously support multiple versions of the data organization, storage schemes, and so on. For example, as the system hardware and software evolve, new features may be incorporated or otherwise provided. Data, indexes, and mappings (for example) which are newer may take advantage of these new features. In the example of FIG. 4, new level N may correspond to one version of the system, while older level N-1 may correspond to a prior version. In order to accommodate these different versions, metadata may be stored in association with each of the levels which indicates which version, which features, compression schemes, and so on, are used by that level. This metadata could be stored as part of the index, the pages themselves, or both. When accesses are made, this metadata then indicates how the data is to be handled properly. Additionally, new schemes and features can be applied dynamically without the need to quiesce the system. In this manner, upgrading of the system is more flexible and a rebuild of older data to reflect newer schemes and approaches is not necessary.

Figure 5A:
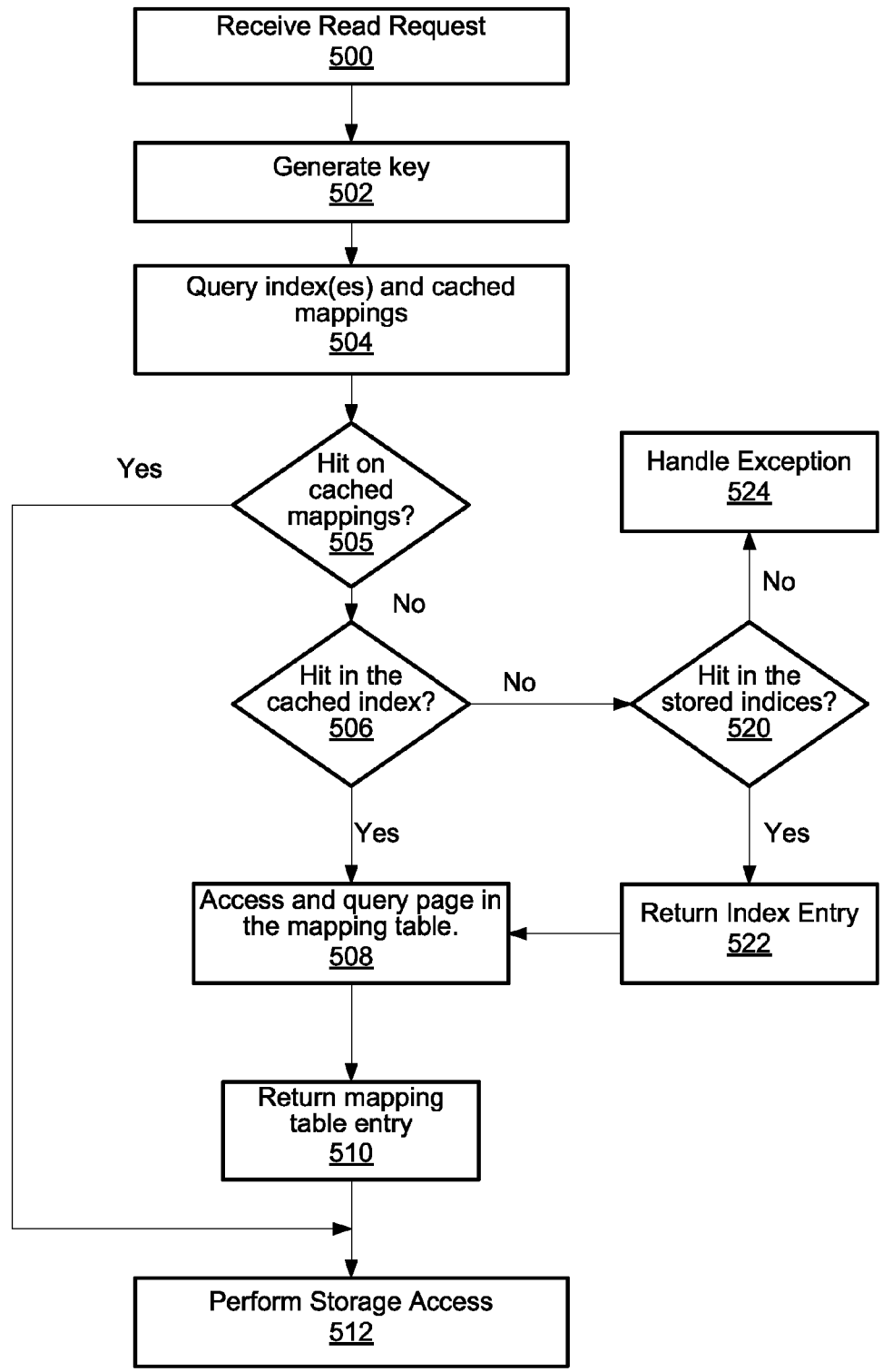
FIG. 5A is a generalized flow diagram illustrating one embodiment of a method for performing a read access.

Turning now to FIG. 5A, one embodiment of a method for servicing a read access is shown. The components embodied in the network architecture 100 and mapping table 340 described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

Read and store (write) requests may be conveyed from one of the clients 110a-110c to one of the data storage arrays 120a-120b. In the example shown, a read request 500 is received, and in block 502 a corresponding query key value may be generated. In some embodiments, the request itself may include the key which is used to access the index and a "generation" of the key 502 is not required. As described earlier, the query key value may be a virtual address index comprising a volume ID, a logical address or virtual address associated with a received request, a snapshot ID, a sector number, and so forth. In embodiments which are used for deduplication, the query key value may be generated using a hash function or other function. Other values are possible and contemplated for the query key value, which is used to access a mapping table.

In block 504, the query key value may be used to access one or more cached indexes to identify one or more portions of a mapping table that may store a mapping that corresponds to the key value. Additionally, recently used mappings which have been cached may be searched as well. If a hit on the cached mappings is detected (block 505), the cached mapping may be used to perform the requested access (block 512). If there is no hit on the cached mappings, the a determination may be made as to whether or not there is a hit on the cached index (block 506). If so, a result corresponding to the hit is used to identify and access the mapping table (block 508). For example, with the primary index 310, an entry storing the query key value also may store a unique virtual page ID that identifies a single particular page within the mapping table. This single particular page may store both the query key value and an associated physical pointer value. In block 508, the identified portion of the mapping table may be accessed and a search performed using the query key value. The mapping table result may then be returned (block 510) and used to perform a storage access (block 512) that corresponds to the target location of the original read request.

In some embodiments, an index query responsive to a read request may result in a miss. Such a miss could be due to only a portion of the index being cached or an error condition (e.g., a read access to a non-existent location, address corruption, etc.). In such a case, an access to the stored index may be performed. If the access to the stored index results in a hit (block 520), then a result may be returned (block 522) which is used to access the mapping tables (block 508). On the other hand, if the access to the stored index results in a miss, then an error condition may be detected. Handling of the error condition may be done in any of a variety of desired ways. In one embodiment, an exception may be generated (block 524) which is then handled as desired. In one embodiment, a portion of the mapping table is returned in block 510. In various embodiments, this portion is a page which may be a 4 KB page, or otherwise. As previously discussed, the records within a page may be sorted to facilitate faster searches of the content included therein.

In one embodiment, the mapping table utilizes traditional database systems methods for information storage in each page. For example, each record (or row or entry) within the mapping table is stored one right after the other. This approach may be used in row-oriented or row-store databases and additionally with correlation databases. These types of databases utilize a value-based storage structure. A value-based storage (VBS) architecture stores a unique data value only once and an auto-generated indexing system maintains the context for all values. In various embodiments, data may be stored by row and compression may be used on the columns (fields) within a row. In some embodiments, the techniques used may include storing a base value and having a smaller field size for the offset and/or having a set of base values, with a column in a row consisting of a base selector and an offset from that base. In both cases, the compression information may be stored within (e.g., at the start) of the partition.

In some embodiments, the mapping table utilizes a column-oriented database system (column-store) method for information storage in each page. Column-stores store each database table column separately. In addition, attribute values belonging to a same column may be stored contiguously, compressed, and densely packed. Accordingly, reading a subset of a table's columns, such as within a page, may be performed relatively quickly. Column data may be of uniform type and may allow storage size optimizations to be used that may not be available in row-oriented data. Some compression schemes, such as Lempel-Ziv-Welch (LZ) and run-length encoding (RLE), take advantage of a detected similarity of adjacent data to compress. A compression algorithm may be chosen that allows individual records within the page to be identified and indexed. Compressing the records within the mapping table may enable fine-grained mapping. In various embodiments, the type of compression used for a particular portion of data may be stored in association with the data. For example, the type of compression could be stored in an index, as part of a same page as the compressed data (e.g., in a header of some type), or otherwise. In this manner, multiple compression techniques and algorithms may be used side by side within the storage system. In addition, in various embodiments the type of compression used for storing page data may be determined dynamically at the time the data is stored. In one embodiment, one of a variety of compression techniques may be chosen based at least in part on the nature and type of data being compressed. In some embodiments, multiple compression techniques will be performed and the one exhibiting the best compression will then be selected for use in compressing the data. Numerous such approaches are possible and are contemplated.

If there is a match of the query key value 306 found in any of the levels of the mapping table (block 508), then in block 510, one or more indications of a hit may be conveyed to the merge logic 350. For example, one or more hit indications may be conveyed from levels "1" to "J" as shown in FIG. 4. The merge logic 350 may choose the highest level, which may also be the youngest level, of the levels "1" to "J" conveying a hit indication. The chosen level may provide information stored in a corresponding record as a result of the access.

In block 512, one or more corresponding fields within a matching record of a chosen page may be read to process a corresponding request. In one embodiment, when the data within the page is stored in a compressed format, the page is decompressed and a corresponding physical pointer value is read out. In another embodiment, only the matching record is decompressed and a corresponding physical pointer value is read out. In one embodiment, a full physical pointer value may be split between the mapping table and a corresponding target physical location. Therefore, multiple physical locations storing user data may be accessed to complete a data storage access request.

Figure 5B:
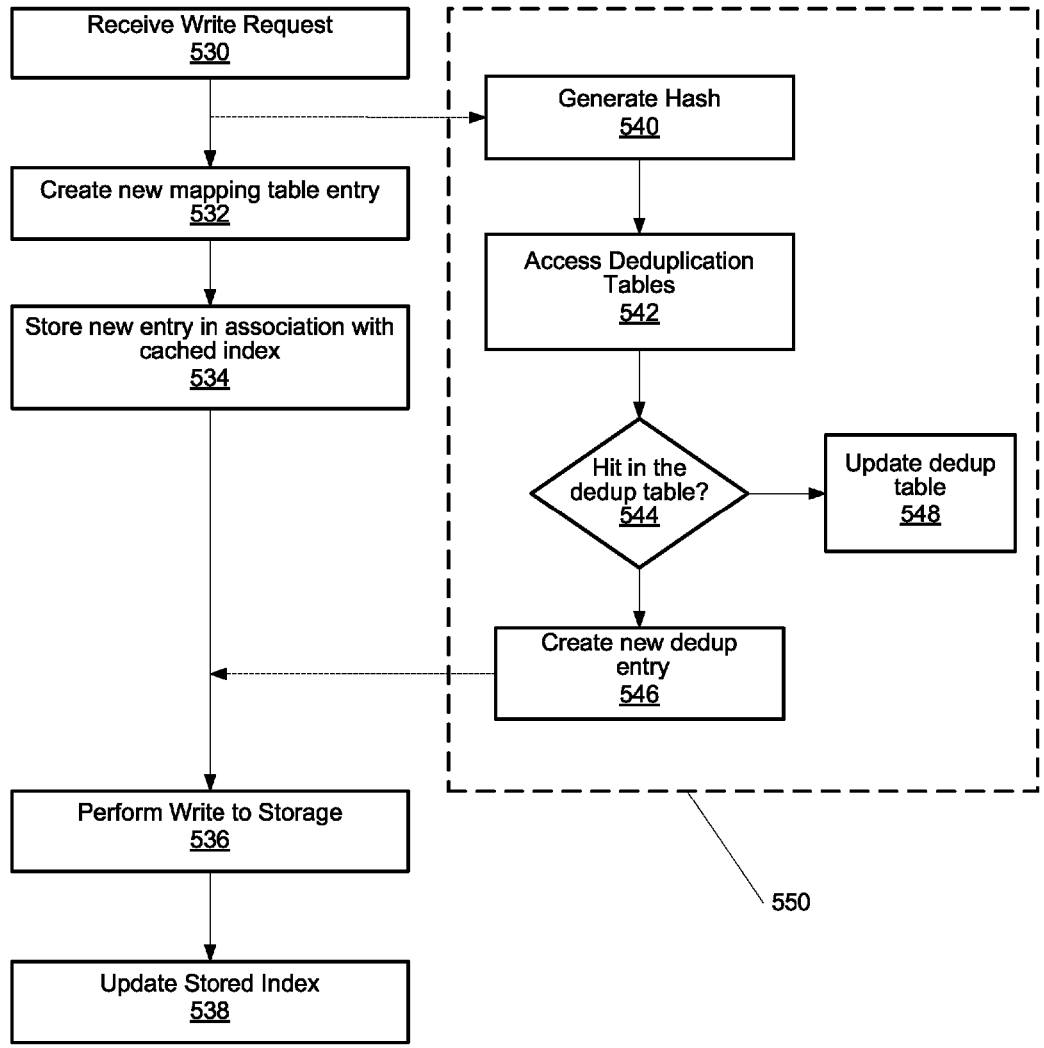
FIG. 5B is a generalized flow diagram illustrating one embodiment of a method for performing a write operation.

Turning now to FIG. 5B, one embodiment of a method corresponding to a received write request is shown. Responsive to a received write request (block 530), a new mapping table entry corresponding to the request may be created (block 532). In one embodiment, a new virtual-to-physical address mapping may be added (block 534) to the mapping table that pairs the virtual address of the write request with the physical location storing the corresponding data component. In various embodiments, the new mapping may be cached with other new mappings and added to a new highest level of the mapping table entries. The write operation to persistent storage (block 536) may then be performed. In various embodiments, writing the new mapping table entry to the mapping tables in persistent storage may not be performed until a later point in time (block 538) which is deemed more efficient. As previously discussed, in a storage system using solid state storage devices, writes to storage are much slower than reads from storage. Accordingly, writes to storage are scheduled in such a way that they minimize impact on overall system performance. In some embodiments, the insertion of new records into the mapping table may be combined with other larger data updates. Combining the updates in this manner may provide for more efficient write operations. It is noted that in the method of 5B, as with each of the methods described herein, operations are described as occurring in a particular order for ease of discussion. However, the operations may in fact occur in a different order, and in some cases various ones of the operations may occur simultaneously. All such embodiments are contemplated.

In addition to the above, deduplication mechanisms may be used in some embodiments. FIG. 5B depicts operations 550 which may generally correspond to deduplication systems and methods. In the example shown, a hash corresponding to a received write request may be generated (block 540) which is used to access deduplication tables (block 542). If there is a hit (block 544) in the deduplication tables (i.e., a copy of the data already exists within the system), then a new entry may be added to the deduplication tables (block 548) to reflect the new write. In such a case, there is no need to write the data itself to storage and the received write data may be discarded. Alternatively, if there is a miss in the deduplication table, then a new entry for the new data is created and stored in the deduplication tables (block 546). Additionally, a write of the data to storage is performed (block 536). Further, a new entry may be created in the index to reflect the new data (block 538). In some embodiments, if a miss occurs during an inline deduplication operation, no insertion in the deduplication tables is performed at that time. Rather, during an inline deduplication operation, a query with a hash value may occur for only a portion of the entire deduplication table (e.g., a cached portion of the deduplication table). If a miss occurs, a new entry may be created and stored in the cache. Subsequently, during a post-processing deduplication operation, such as an operation occurring during garbage collection, a query with a hash value may occur for the entire deduplication table. A miss may indicate the hash value is a unique hash value. Therefore, a new entry such as a hash-to-physical-pointer mapping may be inserted into the deduplication table. Alternatively, if a hit is detected during post-processing deduplication (i.e., a duplicate is detected), deduplication may be performed to eliminate one or more of the detected copies.

Figure 6:
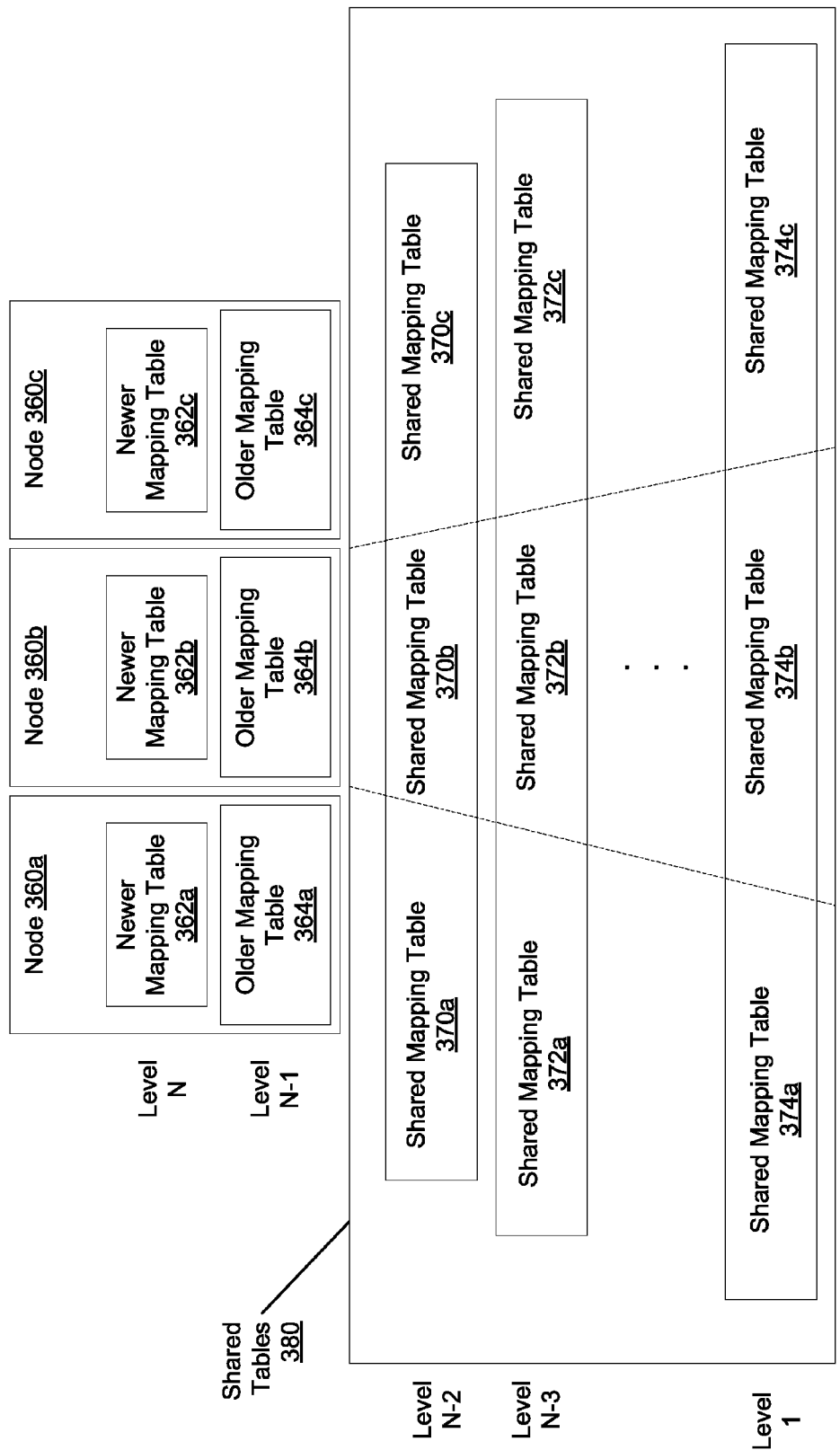
FIG. 6 is a generalized block diagram of one embodiment of a multi-node network with shared mapping tables.

Referring now to FIG. 6, a generalized block diagram of one embodiment of a multi-node network with shared mapping tables is shown. In the example shown, three nodes 360a-360c are used to form a cluster of mapping nodes. In one embodiment, each of the nodes 360a-360c may be responsible for one or more logical unit numbers (LUNs). In the depicted embodiment, a number of mapping table levels, level 1-N, are shown. Level 1 may correspond to the oldest level, while level N may correspond to the newest level. For mapping table entries of LUNs managed by a particular node, that particular node may itself have newer entries stored on the node itself. For example, node 360a is shown to store mapping subtables 362a and 364a. These subtables 362a and 362b may correspond to LUNs for which node 360a is generally responsible. Similarly, node 360b includes subtables 362b and 364b which may correspond to LUNs managed by that node, while node 360c includes subtables 362c and 364c which may correspond to LUNs managed by that node. In such an embodiment, these "newer" level mapping table entries are maintained only by their corresponding managing nodes and are generally not found on other nodes.

In contrast to the above discussed relatively newer levels, older levels (i.e., levels N−2 down to level 1) represent mapping table entries which may be shared by all nodes 360a-360c in the sense that any of the nodes may be storing a copy of those entries. In the example shown, these older levels 370, 372, and 374 are collectively identified as shared tables 380. Additionally, as previously discussed, in various embodiments these older levels are static—apart from merging or similar operations which are discussed later. Generally speaking, a static layer is one which is not subject to modification (i.e., it is "fixed"). Given that such levels are fixed in this sense, an access to any copy of these lower levels may be made without concern for whether another of the copies has been, or is being, modified. Consequently, any of the nodes may safely store a copy of the shared tables 380 and service a request to those tables with confidence the request can be properly serviced. Having copies of the shared tables 380 stored on multiple nodes 360 may allow use of various load balancing schemes when performing lookups and otherwise servicing requests.

In addition to the above, in various embodiments, the levels 380 which may be shared may be organized in a manner which reflects the nodes 360 themselves. For example, node 360a may be responsible for LUNs 1 and 2, node 360b may be responsible for LUNs 3 and 4, and node 360c may be responsible for LUNs 5 and 6. In various embodiments, the mapping table entries may include tuples which themselves identify a corresponding LUN. In such an embodiment, the shared mapping tables 380 may be sorted according to key value, absolute width or amount of storage space, or otherwise. If a sort of mapping table entries in the levels 380 is based in part on LUN, then entries 370a may correspond to LUNs 1 and 2, entries 370b may correspond to LUNs 3 and 4, and entries 370c may correspond to LUNs 5 and 6. Such an organization may speed lookups by a given node for a request targeted to a particular LUN by effectively reducing the amount of data that needs to be searched, allowing a coordinator to directly select the node responsible for a particular LUN as the target of a request. These and other organization and sort schemes are possible and are contemplated. In addition, if it is desired to move responsibility for a LUN from one node to another, the original node mappings for that node may be flushed to the shared levels (e.g., and merged). Responsibility for the LUN is then transferred to the new node which then begins servicing that LUN.

Figure 7:
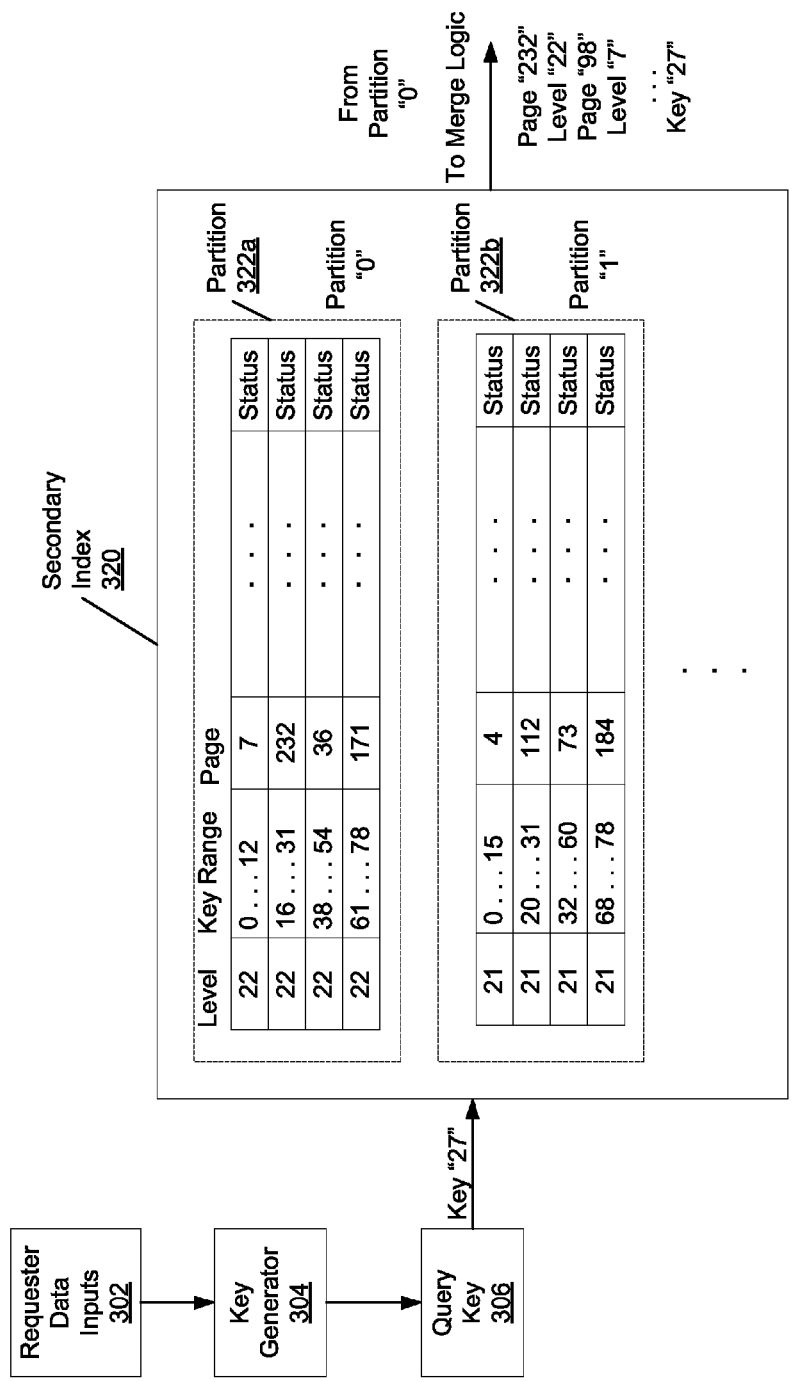
FIG. 7 is a generalized block diagram of one embodiment of a secondary index used to access a mapping table.

Referring now to FIG. 7, a generalized block diagram of one embodiment of a secondary index used to access a mapping table is shown. As described earlier, requester data inputs 302 may be received by a key generator 304, which produces a query key value 306. The query key value 306 is used to access a mapping table. In some embodiments, the primary index 310 shown in FIG. 3 may be too large (or larger than desired) to store in RAM 172 or memory medium 130. For example, older levels of the index may grow very large due to merging and flattening operations described later in FIG. 10 and FIG. 11. Therefore, a secondary index 320 may be cached for at least a portion of the primary index instead of the corresponding portion of the primary index 310. The secondary index 320 may provide a more coarse level of granularity of location identification of data stored in the storage devices 176a-176m. Therefore, the secondary index 320 may be smaller than the portion of the primary index 310 to which it corresponds. Accordingly, the secondary index 320 may be stored in RAM 172 or in memory medium 130.

In one embodiment, the secondary index 320 is divided into partitions, such as partitions 322a-322b. Additionally, the secondary index may be organized according to level with the more recent levels appearing first. In one embodiment, older levels have lower numbers and younger levels have higher numbers (e.g., a level ID may be incremented with each new level). Each entry of the secondary index 320 may identify a range of key values. For example, the first entry shown in the example may identify a range of key values from 0 to 12 in level 22. These key values may correspond to key values associated with a first record and a last record within a given page of the primary index 310. In other words, the entry in the secondary index may simply store an identification of key 0 and an identification of key 12 to indicate the corresponding page includes entries within that range. Referring again to FIG. 3A, partition 312a may be a page and the key values of its first record and its last record are 0 and 12, respectively. Therefore, an entry within the secondary index 320 stores the range 0 to 12 as shown in FIG. 7. Since remappings are maintained in the levels within the mapping table, a range of key values may correspond to multiple pages and associated levels. The fields within the secondary index 320 may store this information as shown in FIG. 7. Each entry may store one or more corresponding unique virtual page identifiers (IDs) and associated level IDs corresponding to the range of key values. Each entry may also store corresponding status information such as validity information. The list of maintained page IDs and associated level IDs may indicate where a given query key value might be stored, but not confirm that the key value is present in that page and level. The secondary index 320 is smaller than the primary index 310, but also has a coarse-level of granularity of location identification of data stored in the storage devices 176a-176m. The secondary index 320 may be sufficiently small to store in RAM 172 or in memory medium 130.

When the secondary index 320 is accessed with a query key value 306, it may convey one or more corresponding page IDs and associated level IDs. These results are then used to access and retrieve portions of the stored primary index. The one or more identified pages may then be searched with the query key value to find a physical pointer value. In one embodiment, the level IDs may be used to determine a youngest level of the identified one or more levels that also store the query key value 306. A record within a corresponding page may then be retrieved and a physical pointer value may be read for processing a storage access request. In the illustrated example, the query key value 27 is within the range of keys 16 to 31. The page IDs and level IDs stored in the corresponding entry are conveyed with the query key value to the mapping table.

Figure 8:
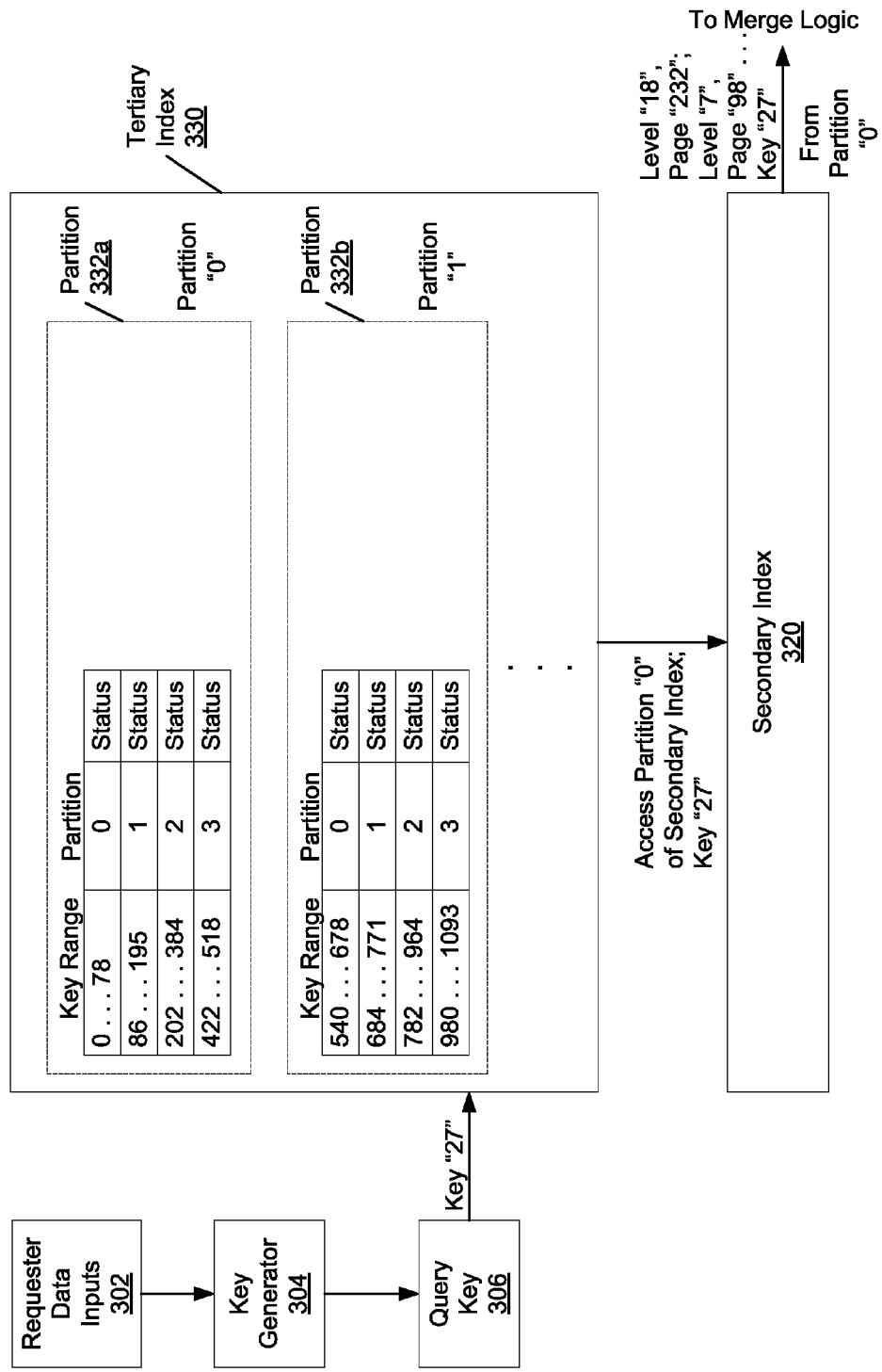
FIG. 8 is a generalized block diagram of one embodiment of a tertiary index accessing a mapping table.

Referring now to FIG. 8, a generalized block diagram of one embodiment of a tertiary index used to access a mapping table is shown. Circuit and logic portions corresponding to those of FIG. 4 are numbered identically. As described earlier, the primary index 310 shown in FIG. 3 may be too large to store in RAM 172 or memory medium 130. In addition, as the mapping table 340 grows, the secondary index 320 may also become too large to store in these memories. Therefore, a tertiary index 330 may be accessed prior to the secondary index 320, which may still be faster than accessing the primary index 310.

The tertiary index 330 may provide a more coarse level of granularity than the secondary index 320 of location identification of data stored in the storage devices 176a-176m. Therefore, the tertiary index 330 may be smaller than the portion of the secondary index 320 to which it corresponds. It is noted that each of the primary index 310, the secondary index 320, the tertiary index 330, and so forth, may be stored in a compressed format. The compressed format chosen may be a same compressed format used to store information within the mapping table 340.

In one embodiment, the tertiary index 330 may include multiple partitions, such as partitions 332a, 332b and so forth. The tertiary index 330 may be accessed with a query key value 306. In the illustrated example, a query key value 306 of "27" is found to be between a range of key values from 0 to 78. A first entry in the tertiary index 330 corresponds to this key value range. A column in the tertiary index 330 may indicate which partition to access within the secondary index 320. In the illustrated example, a key value range of 0 to 78 corresponds to partition 0 within the secondary index 320.

It is also noted a filter (not shown) may be accessed to determine if a query key value is not within any one of the indexes 310-330. This filter may be a probabilistic data structure that determines whether an element is a member of a set. False positives may be possible, but false negatives may not be possible. One example of such a filter is a Bloom filter. If an access of such a filter determines a particular value is not in the full index 142, then no query is sent to the storage. If an access of the filter determines the query key value is in a corresponding index, then it may be unknown whether a corresponding physical pointer value is stored in the storage devices 176a-176m.

In addition to the above, in various embodiments one or more overlay tables may be used to modify or elide tuples provided by the mapping table in response to a query. Such overlay tables may be used to apply filtering conditions for use in responding to accesses to the mapping table or during flattening operations when a new level is created. In various embodiments, other hardware and/or software may be used to apply filtering conditions. In some embodiments, the overlay table may be organized as time ordered levels in a manner similar to the mapping table described above. In other embodiments, they be organized differently. Keys for the overlay table need not match the keys for the underlying mapping table. For example, an overlay table may contain a single entry stating that a particular volume has been deleted or is otherwise inaccessible (e.g., there is no natural access path to query this tuple), and that a response to a query corresponding to a tuple that refers to that volume identifier is instead invalid. In another example, an entry in the overlay table may indicate that a storage location has been freed, and that any tuple that refers to that storage location is invalid, thus invalidating the result of the lookup rather than the key used by the mapping table. In some embodiments, the overlay table may modify fields in responses to queries to the underlying mapping table. In some embodiments, a key range (range of key values) may be used to efficiently identify multiple values to which the same operation (eliding or modification) is applied. In this manner, tuples may (effectively) be "deleted" from the mapping table by creating an "elide" entry in the overlay table and without modifying the mapping table. In this case, the overlay table may include keys with no associated non-key data fields.

Figure 9:
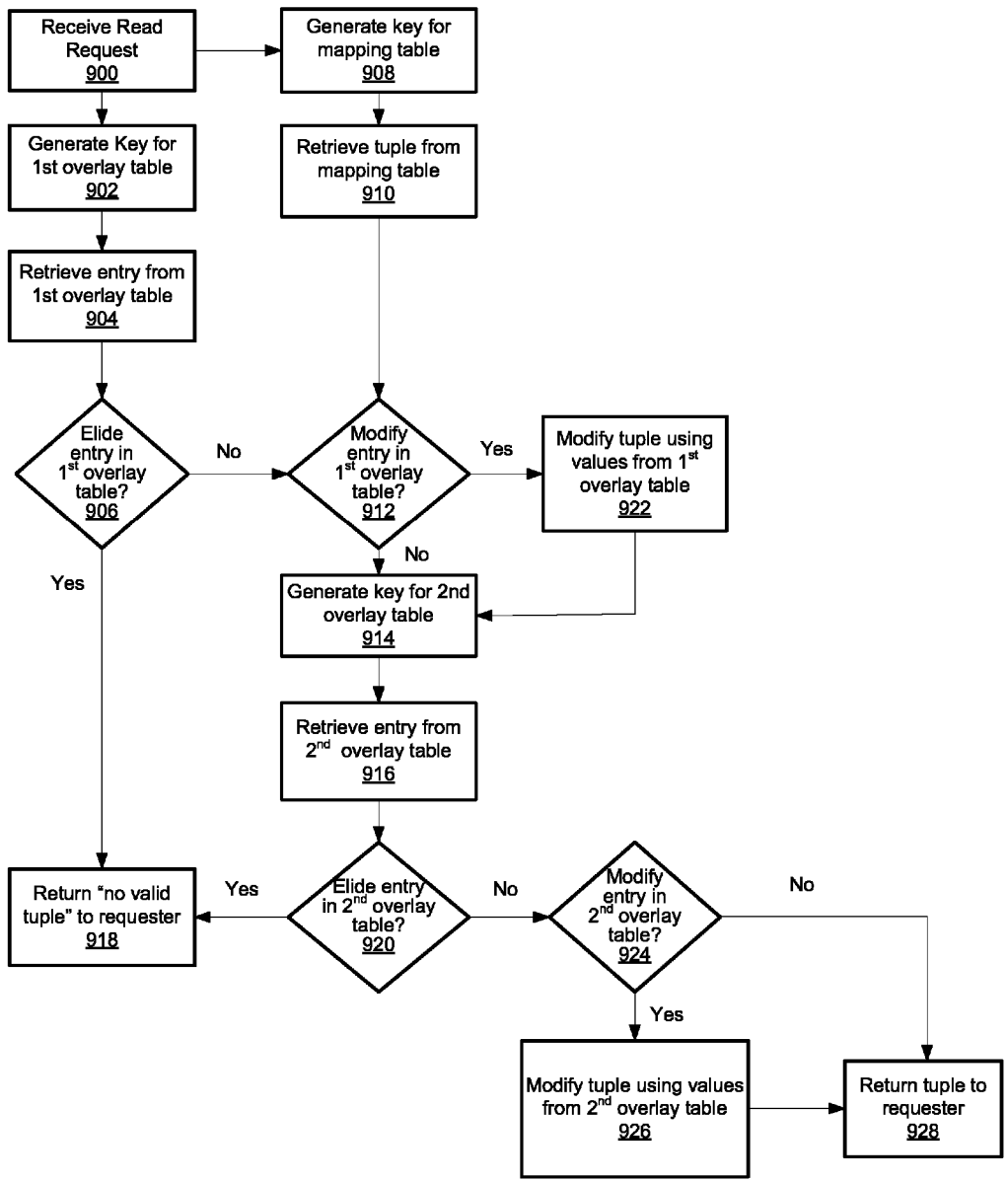
FIG. 9 illustrates one embodiment of a method that utilizes overlay tables.

Turning now to FIG. 9, one embodiment of a method for processing a read request in a system including mapping and overlay tables is shown. Responsive to a read request being received (block 900), a mapping table key (block 908) and first overlay table key (block 902) corresponding to the request are generated. In this example, access to the overlay and mapping tables is shown as occurring concurrently. However, in other embodiments, accesses to the tables may be performed non-concurrently (e.g., sequentially or otherwise separate in time) in any desired order. Using the key generated for the mapping table, a corresponding tuple may be retrieved from the mapping table (block 910). If the first overlay table contains an "elide" entry corresponding to the overlay table key (conditional block 906), any tuple found in the mapping table is deemed invalid and an indication to this effect may be returned to the requester. On the other hand, if the overlay table contains a "modify" entry corresponding to the overlay table key (conditional block 912), the values in the first overlay table entry may be used to modify one or more fields in the tuple retrieved from the mapping table (block 922). Once this process is done, a second overlay table key is generated (block 914) based on the tuple from the mapping table (whether modified or not) and a second lookup is done in a second overlay table (block 916) which may or may not be the same table as the first overlay table. If an "elide" entry is found in the second overlay table (conditional block 920), the tuple from the mapping table is deemed invalid (block 918). If a "modify" entry is found in the second overlay table (conditional block 924), one or more fields of the tuple from the mapping table may be modified (block 926). Such modification may include dropping a tuple, normalizing a tuple, or otherwise. The modified tuple may then be returned to the requester. If the second overlay table does not contain a modify entry (conditional block 924), the tuple may be returned to the requester unmodified. In some embodiments, at least some portions of the overlay table(s) may be cached to provide faster access to their contents. In various embodiments, a detected elide entry in the first overlay table may serve to short circuit any other corresponding lookups (e.g., blocks 914, 916, etc.). In other embodiments, accesses may be performed in parallel and "raced." Numerous such embodiments are possible and are contemplated.

Figure 10:
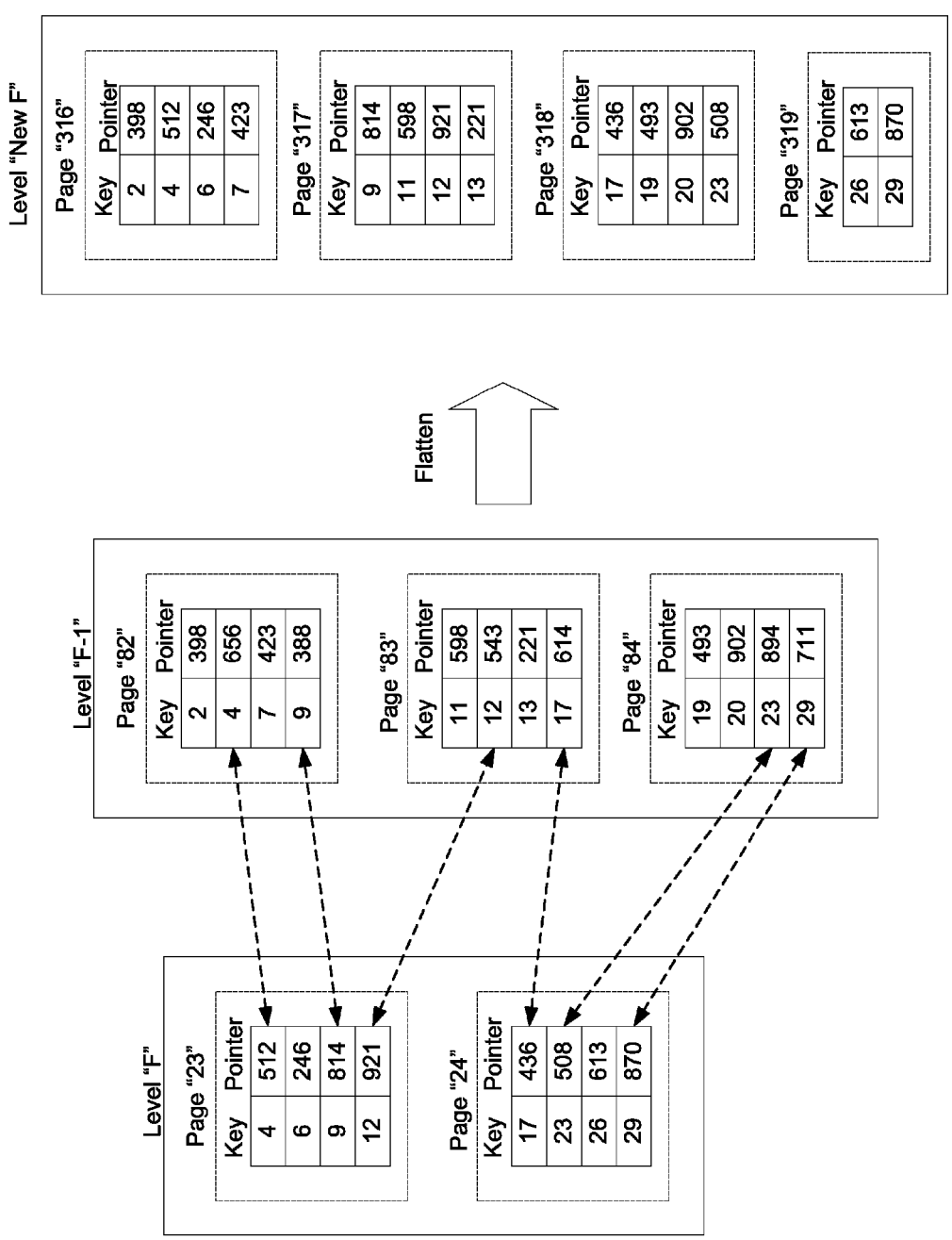
FIG. 10 is a generalized block diagram of one embodiment of a flattening operation for levels within a mapping table.

Turning now to FIG. 10, a generalized block diagram of one embodiment of a flattening operation for levels within a mapping table is shown. In various embodiments, a flattening operation may be performed in response to detecting one or more conditions. For example, over time as the mapping table 340 grows and accumulates levels due to insertions of new records, the cost of searching more levels for a query key value may become undesirably high. In order to constrain the number of levels to search, multiple levels may be flattened into a single new level. For example, two or more levels which are logically adjacent or contiguous in time order may be chosen for a flattening operation. Where two or more records correspond to a same key value, the youngest record may be retained while the others are not included in the new "flattened" level. In such an embodiment, the newly flattened level will return a same result for a search for a given key value as would be provided by a search of the corresponding multiple levels. Since the results of searches in the new flattened level do not change as compared to the two or more levels it replaces, the flattening operation need not be synchronized with update operations to the mapping table. In other words, flattening operations on a table may be performed asynchronously with respect to updates to the table.

As previously noted, older levels are fixed in the sense that their mappings are not modified (i.e., a mapping from A to B remains unchanged). Consequently, modifications to the levels being flattened are not being made (e.g., due to user writes) and synchronization locks of the levels are not required. Additionally, in a node-based cluster environment where each node may store a copy of older levels of the index (e.g., as discussed in relation to FIG. 6), flattening operations may be undertaken on one node without the need to lock corresponding levels in other nodes. Consequently, processing may continue in all nodes while flattening takes place in an asynchronous manner on any of the nodes. At a later point in time, other nodes may flatten levels, or use an already flattened level. In one embodiment, the two or more levels which have been used to form a flattened level may be retained for error recovery, mirroring, or other purposes. In addition to the above, in various embodiments, records that have been elided may not be reinserted in to the new level. The above described flattening may, for example, be performed responsive to detecting the number of levels in the mapping table has reached a given threshold. Alternatively, the flattening may be performed responsive to detecting the size of one or more levels has exceeded a threshold. Yet another condition that may be considered is the load on the system. The decision of whether to flatten the levels may consider combinations of these conditions in addition to considering them individually. The decision of whether to flatten may also consider both the present value for the condition as well as a predicted value for the condition in the future. Other conditions for which flattening may be performed are possible and are contemplated.

In the illustrated example, the records are shown simply as key and pointer pairs. The pages are shown to include four records for ease of illustration. A level "F" and its next contiguous logical neighbor, level "F–1" may be considered for a flattening operation. Level "F" may be younger than Level "F–1". Although two levels are shown to be flattened here, it is possible and contemplated that three or more levels may be chosen for flattening. In the example shown, Level "F–1" may have records storing a same key value found in Level "F". Bidirectional arrows are used to identify the records storing a same key value across the two contiguous levels.

The new Level "New F" includes a key corresponding to the duplicate key values found in Level "F" and Level "F–1". In addition, the new Level "New F" includes a pointer value corresponding to the youngest (or younger in this case) record of the records storing the duplicate key value. For example, each of Level "F" and Level "F–1" includes a record storing the key value 4. The younger record is in Level "F" and this record also stores the pointer value 512. Accordingly, the Level "F–1" includes a record storing the key value 4 and also the pointer value 512, rather than the pointer value 656 found in the older Level "F–1". Additionally, the new Level "New F" includes records with unique key values found between Level "F" and Level "F–1". For example, the Level "F–1" includes records with the key and pointer pair of 6 and 246 found in Level "F" and the key and pointer pair of 2 and 398 found in Level "F–1". As shown, each of the pages within the levels is sorted by key value.

As noted above, in various embodiments an overlay table may be used to modify or elide tuples corresponding to key values in the underlying mapping table. Such an overlay table(s) may be managed in a manner similar to that of the mapping tables. For example, an overlay table may be flattened and adjacent entries merged together to save space. Alternatively, an overlay table may be managed in a manner different from that used to manage mapping tables. In some embodiments, an overlay table may contain a single entry that refers to a range of overlay table keys. In this way, the size of the overlay table can be limited. For example, if the mapping table contains k valid entries, the overlay table (after flattening) need contain no more than k+1 entries marking ranges as invalid, corresponding to the gaps between valid entries in the mapping table. Accordingly, the overlay table may used to identify tuples that may be dropped from the mapping table in a relatively efficient manner. In addition to the above, while the previous discussion describes using overlay table to elide or modify responses from the mapping table(s), overlay tables may also be used to elide or modify values during flattening operations of the mapping tables. Accordingly, when a new level is created during a flattening operation of a mapping table, a key value that might otherwise be inserted into the new level may be elided. Alternatively, a value may be modified before insertion in the new level. Such modifications may result in a single record corresponding to a given range of key values in the mapping table being replaced (in the new level) with multiple records—each corresponding to a subrange of the original record. Additionally, a record may be replaced with a new record that corresponds to a smaller range, or multiple records could be replaced by a single record whose range covers all ranges of the original records. All such embodiments are contemplated.

Figure 11:
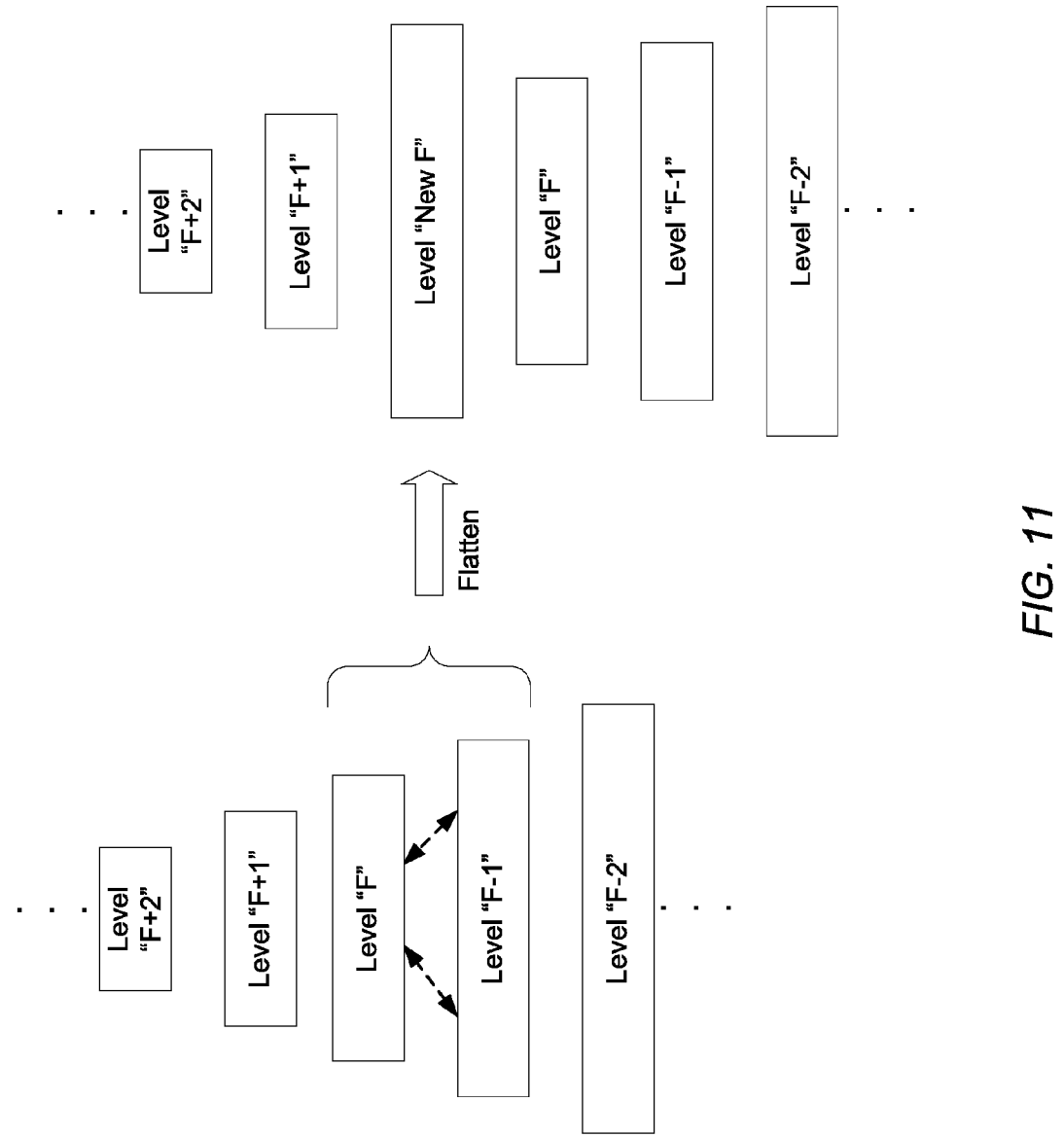
FIG. 11 is a generalized block diagram of another embodiment of a flattening operation for levels within a mapping table.

Referring now to FIG. 11, a generalized block diagram of an embodiment of a flattening operation for levels within a mapping table is shown. As previously discussed, levels may be time ordered. In the illustrated example, a Level "F" comprising one or more indexes and corresponding mappings is logically located above older Level "F−1". Also, Level "F" is located logically below younger Level "F+1". Similarly, Level "F−2" is logically located above younger Level "F−1" and Level "F+2" is logically located below older Level "F+1". In one example, levels "F" and "F−1" may be considered for a flattening operation. Bidirectional arrows are used to illustrate there are records storing same key values across the two contiguous levels.

As described earlier, a new Level "New F" includes key values corresponding to the duplicate key values found in Level "F" and Level "F−1". In addition, the new Level "New F" includes a pointer value corresponding to the youngest (or younger in this case) record of the records storing the duplicate key value. Upon completion of the flattening operation, the Level "F" and the Level "F−1" may not yet be removed from the mapping table. Again, in a node-based cluster, each node may verify it is ready to utilize the new single level, such as Level "New F", and no longer use the two or more levels it replaces (such as Level "F" and Level "F−1"). This verification may be performed prior to the new level becoming the replacement. In one embodiment, the two or more replaced levels, such as Level "F" and Level "F−1", may be kept in storage for error recovery, mirroring, or other purposes. In order to maintain the time ordering of the levels and their mappings, the new flattened level F is logically placed below younger levels (e.g., level F+1) and above the original levels that it replaces (e.g., level F and level F−1).

Figure 12:
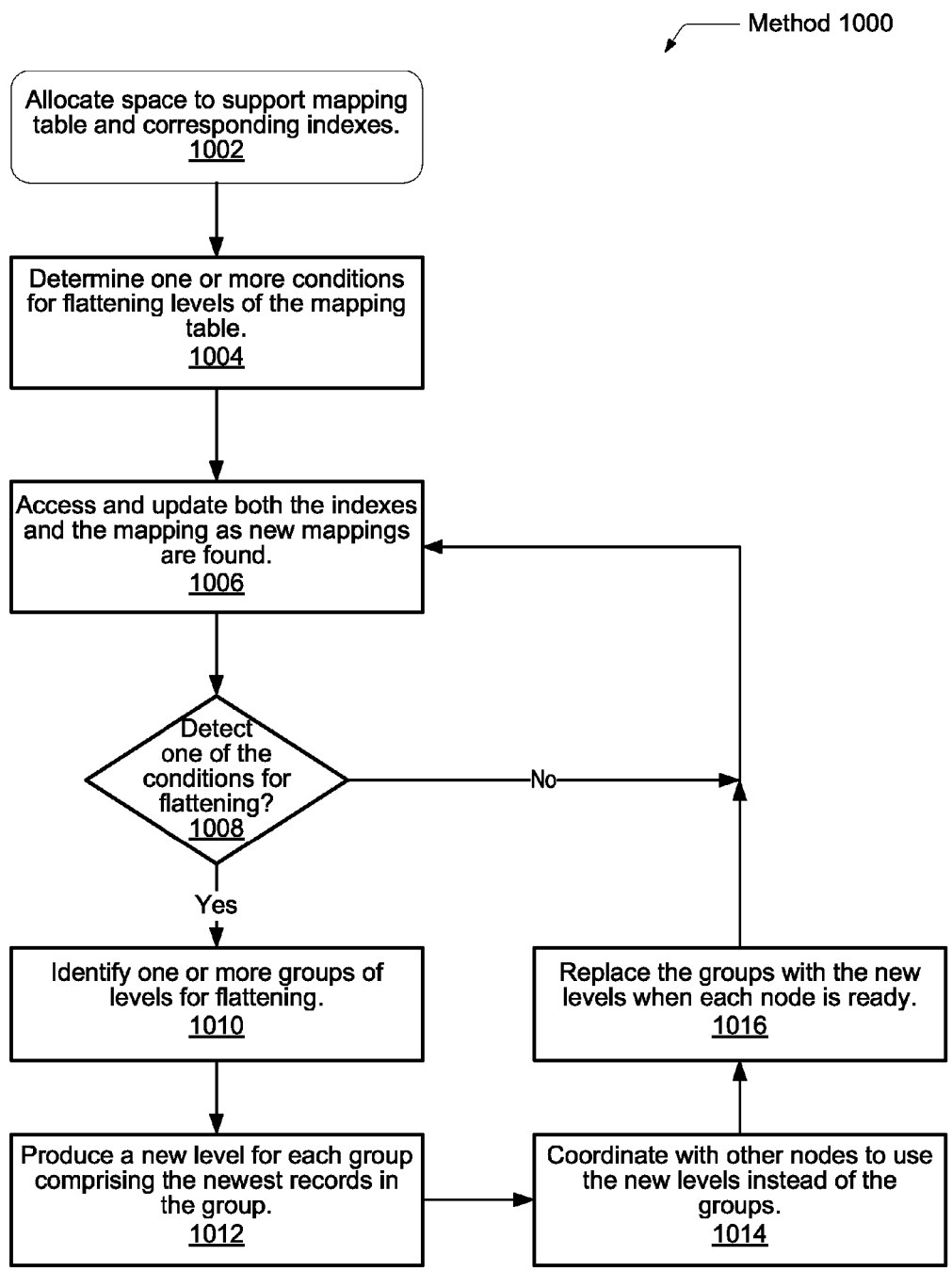
FIG. 12 is a generalized flow diagram illustrating one embodiment of a method for flattening levels within a mapping table.

Turning now to FIG. 12, one embodiment of a method 1000 for flattening levels within a mapping table is shown. The components embodied in the network architecture 100 and the mapping table 340 described above may generally operate in accordance with method 1000. For purposes of discussion, the steps in this embodiment are shown in sequential order. However, some steps may occur in a different order than shown, some steps may be performed concurrently, some steps may be combined with other steps, and some steps may be absent in another embodiment.

In block 1002, storage space is allocated for a mapping table and corresponding indexes. In block 1004, one or more conditions are determined for flattening two or more levels within the mapping table. For example, a cost of searching a current number of levels within the mapping table may be greater than a cost of performing a flattening operation. Additionally, a cost may be based on at least one of the current (or predicted) number of levels in the structure to be flattened, the number of entries in one or more levels, the number of mapping entries that would be elided or modified, and the load on the system. Cost may also include a time to perform a corresponding operation, an occupation of one or more buses, storage space used during a corresponding operation, a number of duplicate entries in a set of levels has reached some threshold, and so forth. In addition, a count of a number of records within each level may be used to estimate when a flattening operation performed on two contiguous levels may produce a new single level with a number of records equal to twice a number of records within a next previous level. These conditions taken singly or in any combination, and others, are possible and are contemplated.

In block 1006, the indexes and the mapping table are accessed and updated as data is stored and new mappings are found. A number of levels within the mapping table increases as new records are inserted into the mapping table. If a condition for flattening two or more levels within the mapping table is detected (conditional block 1008), then in block 1010, one or more groups of levels are identified for flattening. A group of levels may include two or more levels. In one embodiment, the two or more levels are contiguous levels. Although the lowest levels, or the oldest levels, may be the best candidates for flattening, a younger group may also be selected.

In block 1012, for each group a new single level comprising the newest records within a corresponding group is produced. In the earlier example, the new single Level "New F" includes the youngest records among the Level "F" and the Level "F+1". In block 1014, in a node-based cluster, an acknowledgment may be requested from each node within the cluster to indicate a respective node is ready to utilize the new levels produced by the flattening operation. When each node acknowledges that it can utilize the new levels, in block 1016, the current levels within the identified groups are replaced with the new levels. In other embodiments, synchronization across nodes is not needed. In such embodiments, some nodes may begin using a new level prior to other nodes. Further, some nodes may continue to use the original level even after newly flattened levels are available. For example, a particular node may have original level data cached and used that in preference to using non-cached data of a newly flattened level. Numerous such embodiments are possible and are contemplated.

Figure 13:
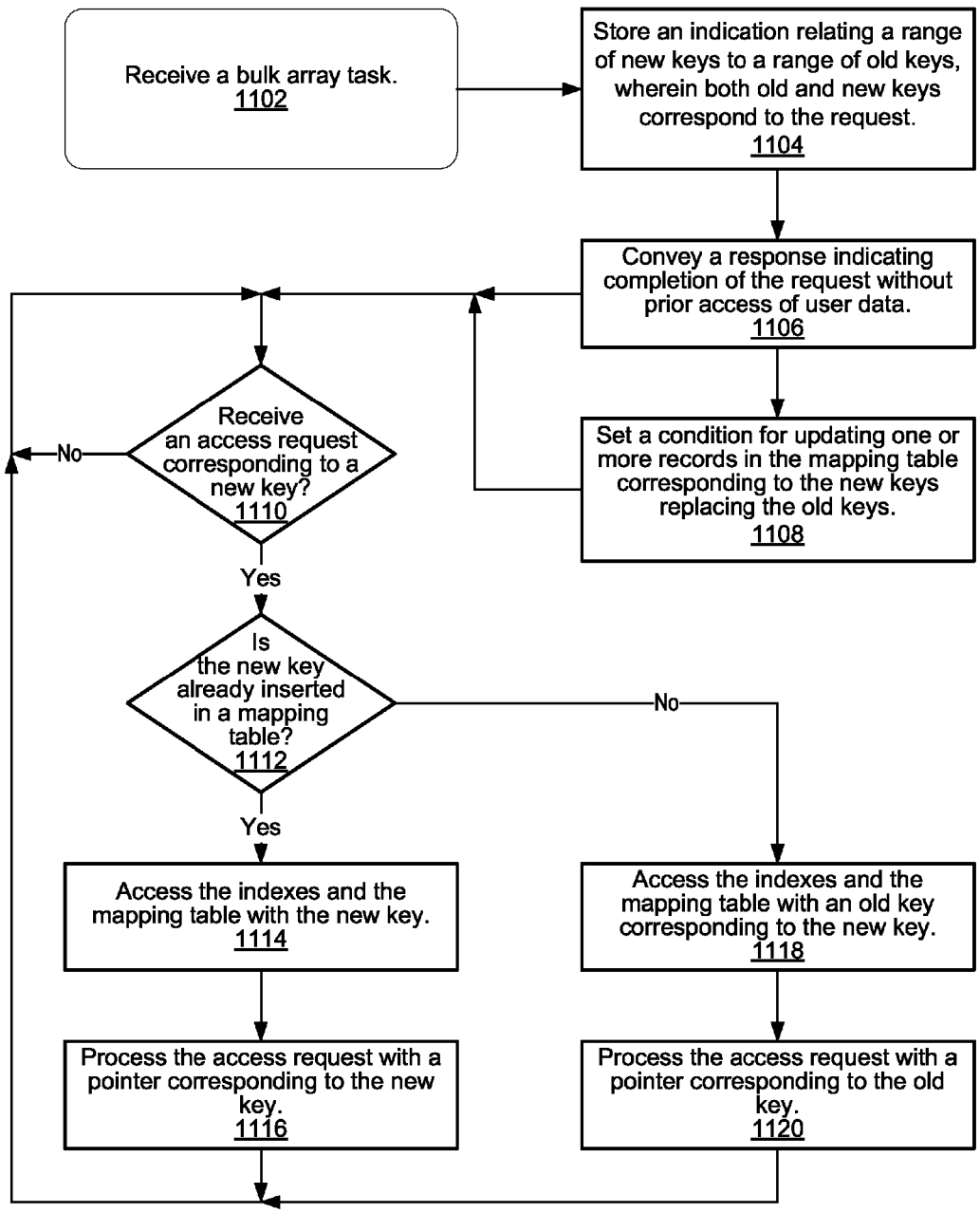
FIG. 13 is a generalized flow diagram illustrating one embodiment of a method for efficiently processing bulk array tasks within a mapping table.

Turning now to FIG. 13, one embodiment of a method 1100 for efficiently processing bulk array tasks within a mapping table is shown. Similar to the other described methods, the components embodied in the network architecture 100 and the mapping table 340 described above may generally operate in accordance with method 1100. In addition, the steps in this embodiment are shown in sequential order. However, some steps may occur in a different order than shown, some steps may be performed concurrently, some steps may be combined with other steps, and some steps may be absent in another embodiment.

Storing the information in a compressed format within the mapping table may enable fine-grained mapping, which may allow direct manipulation of mapping information within the mapping table as an alternative to common bulk array tasks. The direct map manipulation may reduce I/O network and bus traffic. As described earlier, Flash memory has a low "seek time", which allows a number of dependent read operations to occur in less time than a single operation from a spinning disk. These dependent reads may be used to perform online fine-grained mappings to integrate space-saving features like compression and deduplication. In addition, these dependent read operations may allow the storage controller 174 to perform bulk array tasks entirely within a mapping table instead of accessing (reading and writing) the user data stored within the storage devices 176a-176m.

In block 1102, a large or bulk array task is received. For example, a bulk copy or move request may correspond to a backup of a dozens or hundreds of virtual machines in addition to enterprise application data being executed and updated by the virtual machines. The amount of data associated with the received request associated with a move, branch, clone, or copy of all of this data may be as large as 16 gigabytes (GB) or larger. If the user data was accessed to process this request, a lot of processing time may be spent on the request and system performance decreases. In addition, a virtualized environment typically has less total input/output (I/O) resources than a physical environment.

In block 1104, the storage controller 174 may store an indication corresponding to the received request that relates a range of new keys to a range of old keys, wherein both the ranges of keys correspond to the received request. For example, if the received request is to copy of 16 GB of data, a start key value and an end key value corresponding to the 16 GB of data may be stored. Again, each of the start and the end key values may include a volume ID, a logical or virtual address within the received request, a snapshot ID, a sector number and so forth. In one embodiment, this information may be stored separate from the information stored in the indexes, such as the primary index 310, the secondary index 320, the tertiary index 330, and so forth. However, this information may be accessed when the indexes are accessed during the processing of later requests.

In block 1106, the data storage controller 174 may convey a response to a corresponding client of the client computer systems 110a-110c indicating completion of the received request without prior access of user data. Therefore, the storage controller 174 may process the received request with low or no downtime and with no load on processor 122.

In block 1108, the storage controller 174 may set a condition, an indication, or a flag, or buffer update operations, for updating one or more records in the mapping table corresponding to the new keys replacing the old keys in the mapping table. For both a move request and a copy request, one or more new records corresponding to the new keys may be inserted in the mapping table. The keys may be inserted in a created new highest level as described earlier. For a move request, one or more old records may be removed from the mapping table after a corresponding new record has been inserted in the mapping table. Either immediately or at a later time, the records in the mapping table are actually updated.

For a zeroing or an erase request, an indication may be stored that a range of key values now corresponds to a series of binary zeroes. Additionally, as discussed above, overlay tables may be used to identify key values which are not (or no longer) valid. The user data may not be overwritten. For an erase request, the user data may be overwritten at a later time when the "freed" storage locations are allocated with new data for subsequent store (write) requests. For an externally-directed defragmentation request, contiguous addresses may be chosen for sector reorganization, which may benefit applications executed on a client of the client computer systems 110a-110c.

If the storage controller 174 receives a data storage access request corresponding to one of the new keys (conditional block 1110), and the new key has already been inserted in the mapping table (conditional block 1112), then in block 1114, the indexes and the mapping table may be accessed with the new key. For example, either the primary index 310, the secondary index 320, or the tertiary index 330 may be accessed with the new key. When one or more pages of the mapping table are identified by the indexes, these identified pages may then be accessed. In block 1116, the storage access request may be serviced with a physical pointer value found in the mapping table that is associated with the new key.

If the storage controller 174 receives a data storage access request corresponding to one of the new keys (conditional block 1110), and the new key has not already been inserted in the mapping table (conditional block 1112), then in block 1118, the indexes and the mapping table may be accessed with a corresponding old key. The storage holding the range of old keys and the range of new keys may be accessed to determine the corresponding old key value. When one or more pages of the mapping table are identified by the indexes, these identified pages may then be accessed. In block 1120, the storage access request may be serviced with a physical pointer value found in the mapping table that is associated with the old key.

Figure 14:
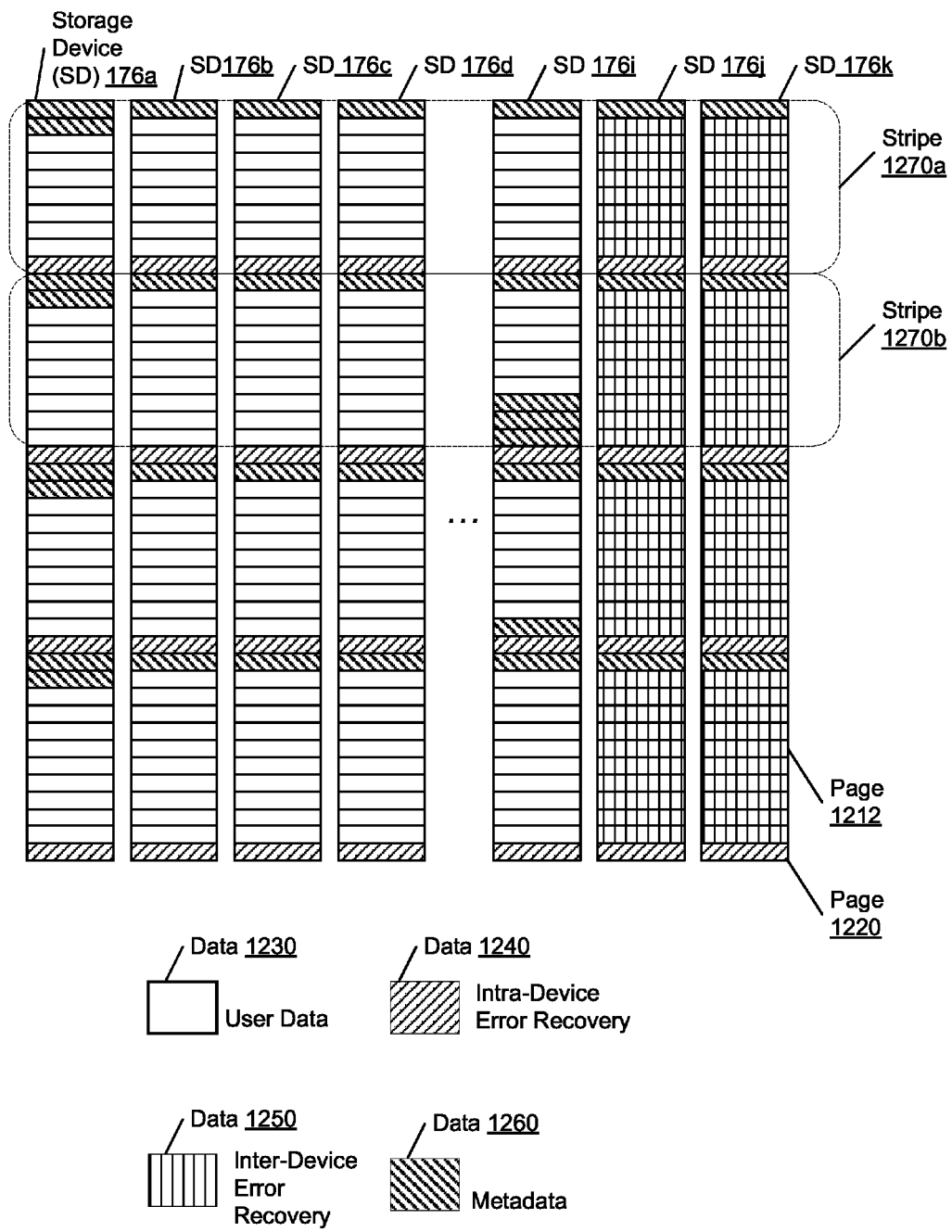
FIG. 14 is a generalized block diagram illustrating an embodiment of a data layout architecture within a storage device.

Turning now to FIG. 14, a generalized block diagram illustrating an embodiment of a data layout architecture within a storage device is shown. In one embodiment, the data storage locations within the storage devices 176a-176m may be arranged into redundant array of independent devices (RAID) arrays. As shown, different types of data may be stored in the storage devices 176a-176k according to a data layout architecture. In one embodiment, each of the storage devices 176a-176k is an SSD. An allocation unit within an SSD may include one or more erase blocks within an SSD.

The user data 1230 may be stored within one or more pages included within one or more of the storage devices 176a-176k. Within each intersection of a RAID stripe and one of the storage devices 176a-176k, the stored information may be formatted as a series of logical pages. Each logical page may in turn include a header and a checksum for the data in the page. When a read is issued it may be for one or more logical pages and the data in each page may be validated with the checksum. As each logical page may include a page header that contains a checksum for the page (which may be referred to as a "media" checksum), the actual page size for data may be smaller than one logical page. In some embodiments, for pages storing inter-device recovery data 1250, such as RAID parity information, the page header may be smaller, so that the parity page protects the page checksums in the data pages. In other embodiments, the checksum in parity pages storing inter-device recovery data 1250 may be calculated so that the checksum of the data page checksums is the same as the checksum of the parity page covering the corresponding data pages. In such embodiments, the header for a parity page need not be smaller than the header for a data page.

The inter-device ECC data 1250 may be parity information generated from one or more pages on other storage devices holding user data. For example, the inter-device ECC data 1250 may be parity information used in a RAID data layout architecture. Although the stored information is shown as contiguous logical pages in the storage devices 176a-176k, it is well known in the art the logical pages may be arranged in a random order, wherein each of the storage devices 176a-176k is an SSD.

The intra-device ECC data 1240 may include information used by an intra-device redundancy scheme. An intra-device redundancy scheme utilizes ECC information, such as parity information, within a given storage device. This intra-device redundancy scheme and its ECC information corresponds to a given device and may be maintained within a given device, but is distinct from ECC that may be internally generated and maintained by the device itself. Generally speaking, the internally generated and maintained ECC of the device is invisible to the system within which the device is included.

The intra-device ECC data 1240 may also be referred to as intra-device error recovery data 1240. The intra-device error recovery data 1240 may be used to protect a given storage device from latent sector errors (LSEs). An LSE is an error that is undetected until the given sector is accessed. Therefore, any data previously stored in the given sector may be lost. A single LSE may lead to data loss when encountered during RAID reconstruction after a storage device failure. The term "sector" typically refers to a basic unit of storage on a HDD, such as a segment within a given track on the disk. Here, the term "sector" may also refer to a basic unit of allocation on a SSD. Latent sector errors (LSEs) occur when a given sector or other storage unit within a storage device is inaccessible. A read or write operation may not be able to complete for the given sector. In addition, there may be an uncorrectable error-correction code (ECC) error.

The intra-device error recovery data 1240 included within a given storage device may be used to increase data storage reliability within the given storage device. The intra-device error recovery data 1240 is in addition to other ECC information that may be included within another storage device, such as parity information utilized in a RAID data layout architecture.

Within each storage device, the intra-device error recovery data 1240 may be stored in one or more pages. As is well known by those skilled in the art, the intra-device error recovery data 1240 may be obtained by performing a function on chosen bits of information within the user data 1230. An XOR-based operation may be used to derive parity information to store in the intra-device error recovery data 1240. Other examples of intra-device redundancy schemes include single parity check (SPC), maximum distance separable (MDS) erasure codes, interleaved parity check codes (IPC), hybrid SPC and MDS code (MDS+SPC), and column diagonal parity (CDP). The schemes vary in terms of delivered reliability and overhead depending on the manner the data 1240 is computed.

In addition to the above described error recovery information, the system may be configured to calculate a checksum value for a region on the device. For example, a checksum may be calculated when information is written to the device. This checksum is stored by the system. When the information is read back from the device, the system may calculate the checksum again and compare it to the value that was stored originally. If the two checksums differ, the information was not read properly, and the system may use other schemes to recover the data. Examples of checksum functions include cyclical redundancy check (CRC), MD5, and SHA-1.

An erase block within an SSD may comprise several pages. A page may include 4 KB of data storage space. An erase block may include 64 pages, or 256 KB. In other embodiments, an erase block may be as large as 1 megabyte (MB), and include 256 pages. An allocation unit size may be chosen in a manner to provide both sufficiently large sized units and a relatively low number of units to reduce overhead tracking of the allocation units. In one embodiment, one or more state tables may maintain a state of an allocation unit (allocated, free, erased, error), a wear level, and a count of a number of errors (correctable and/or uncorrectable) that have occurred within the allocation unit. In one embodiment, an allocation unit is relatively small compared to the total storage capacity of an SSD. Other amounts of data storage space for pages, erase blocks and other unit arrangements are possible and contemplated.

The metadata 1260 may include page header information, RAID stripe identification information, log data for one or more RAID stripes, and so forth. In various embodiments, the single metadata page at the beginning of each stripe may be rebuilt from the other stripe headers. Alternatively, this page could be at a different offset in the parity shard so the data can be protected by the inter-device parity. In one embodiment, the metadata 1260 may store or be associated with particular flag values that indicate this data is not to be deduplicated.

In addition to inter-device parity protection and intra-device parity protection, each of the pages in storage devices 176a-176k may comprise additional protection such as a checksum stored within each given page. The checksum (8 byte, 4 byte, or otherwise) may be placed inside a page after a header and before the corresponding data, which may be compressed. For yet another level of protection, data location information may be included in a checksum value. The data in each of the pages may include this information. This information may include both a virtual address and a physical address. Sector numbers, data chunk and offset numbers, track numbers, plane numbers, and so forth may be included in this information as well. This mapping information may also be used to rebuild the address translation mapping table if the content of the table is lost.

In one embodiment, each of the pages in the storage devices 176a-176k stores a particular type of data, such as the data types 1230-1260. Alternatively, pages may store more than one type of data. The page header may store information identifying the data type for a corresponding page. In one embodiment, an intra-device redundancy scheme divides a device into groups of locations for storage of user data. For example, a division may be a group of locations within a device that correspond to a stripe within a RAID layout. In the example shown, only two stripes, 1270a and 1270b, are shown for ease of illustration.

In one embodiment, a RAID engine within the storage controller 174 may determine a level of protection to use for storage devices 176a-176k. For example, a RAID engine may determine to utilize RAID double parity for the storage devices 176a-176k. The inter-device redundancy data 1250 may represent the RAID double parity values generated from corresponding user data. In one embodiment, storage devices 176j and 176k may store the double parity information. It is understood other levels of RAID parity protection are possible and contemplated. In addition, in other embodiments, the storage of the double parity information may rotate between the storage devices rather than be stored within storage devices 176j and 176k for each RAID stripe. The storage of the double parity information is shown to be stored in storage devices 176j and 176k for ease of illustration and description. Although each of the storage devices 176a-176k comprises multiple pages, only page 1212 and page 1220 are labeled for ease of illustration.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a data storage medium;
   a data storage controller coupled to the data storage medium;
   a plurality of processes; and
   a mapping table organized as a plurality of time ordered levels, wherein each level of the plurality of levels comprises one or more mapping table entries, and wherein each of the plurality of entries comprises a tuple including a key that may be used to identify data stored within the system;
   wherein only a first process of the processes is permitted to modify data corresponding to a first subset of the tuple key values, and only a second process of the processes is permitted to modify data corresponding to a second subset of the tuple key values, wherein the second subset does not overlap the first subset;
   wherein data corresponding to levels of the time ordered levels which are older than a given time are accessible by both the first process and the second process, wherein said data includes entries corresponding to both the first subset of the tuple key values and the second subset of the tuple key values.

2. The system as recited in claim 1, wherein in response to detecting a new record is to be inserted into the mapping table:
   existing levels of the mapping table are made read only;
   a new writable level is created; and
   an entry corresponding to the new record is stored in the new level.

3. The system as recited in claim 1, further comprising a third subset of the tuple key values different from the first subset and the second subset, wherein a process is not assigned to manage modifications of the third subset of the tuple key values until an update to data corresponding to the third subset is performed.

4. The system as recited in claim 3, wherein prior to a process being assigned to manage modifications of data corresponding to the third subset, any process of the processes may service a read access to the data corresponding to the third subset.

5. The system as recited in claim 1, wherein two or more processes of the plurality of processes may service queries for a given key to multiple levels of the plurality of levels simultaneously.

6. The system as recited in claim 5, wherein a result corresponding to a most recent level of the plurality of levels provided by the two or more processes is selected as the final result.

7. The system as recited in claim 5, wherein the given key corresponds to a subset managed by a particular process and levels in memory are queried by the particular process, and wherein levels which may be cached by other processes may be queried by those other processes.

8. The system as recited in claim 1, wherein levels of the plurality of levels other than a newest level each include a plurality of entries and are read only and the newest level is writable.

9. A method for use in a storage system, the method comprising:
   executing a plurality of processes in the system;
   organizing a mapping table as a plurality of time ordered levels, wherein each level of the plurality of levels comprises one or more mapping table entries, and wherein each of the plurality of entries comprises a tuple including a key that may be used to identify data stored within the system;
   permitting only a first process of the processes to modify data corresponding to a first subset of the tuple key values;
   permitting only a second process of the processes to modify data corresponding to a second subset of the tuple key values, wherein the second subset does not overlap the first subset;
   wherein data corresponding to levels of the time ordered levels which are older than a given time are accessible by both the first process and the second process, wherein said data includes entries corresponding to both the first subset of the tuple key values and the second subset of the tuple key values.

10. The method as recited in claim 9, wherein in response to detecting a new record is to be inserted into the mapping table:
    existing levels of the mapping table are made read only;
    a new writable level is created; and
    an entry corresponding to the new record is stored in the new level.

11. The method as recited in claim 9, further comprising a third subset of the tuple key values different from the first subset and the second subset, and wherein a process is not assigned to manage modifications of the third subset of the tuple key values until an update to data corresponding to the third subset is performed.

12. The method as recited in claim 11, further comprising any process of the processes servicing a read access to the data corresponding to the third subset prior to a process being assigned to manage modifications of data corresponding to the third subset.

13. The method as recited in claim 9, further comprising two or more processes of the plurality of processes servicing queries for a given key to multiple levels of the plurality of levels simultaneously.

14. The method as recited in claim 13, further comprising selected as the final result a result corresponding to a most recent level of the plurality of levels provided by the two or more processes.

15. The method as recited in claim 13, wherein the given key corresponds to a subset managed by a particular process and levels in memory are queried by the particular process, and wherein levels which may be cached by other processes may be queried by those other processes.

16. The method as recited in claim 9, wherein levels of the plurality of levels other than the newest level are read only.

17. A non-transitory computer readable storage medium storing program instruction executable by a processor to:
- execute a plurality of processes in the system;
- organize a mapping table as a plurality of time ordered levels, wherein each level of the plurality of levels comprises one or more mapping table entries, and wherein each of the plurality of entries comprises a tuple including a key that may be used to identify data stored within the system;
- permit only a first process of the processes to modify data corresponding to a first subset of the tuple key values;
- permit only a second process of the processes to modify data corresponding to a second subset of the tuple key values, wherein the second subset does not overlap the first subset;
- wherein data corresponding to levels of the time ordered levels which are older than a given time are accessible by both the first process and the second process, wherein said data includes entries corresponding to both the first subset of the tuple key values and the second subset of the tuple key values.

18. The storage medium as recited in claim 17, wherein in response to detecting a new record is to be inserted into the mapping table:
- existing levels of the mapping table are made read only;
- a new writable level is created; and
- an entry corresponding to the new record is stored in the new level.

19. The storage medium as recited in claim 17, further comprising a third subset of the tuple key values different from the first subset and the second subset, and wherein the program instructions are executable to not assign a process to manage modifications of the third subset of the tuple key values until an update to data corresponding to the third subset is performed.

20. The storage medium as recited in claim 19, wherein the program instructions are further executable to allow any process of the processes to service a read access to the data corresponding to the third subset prior to a process being assigned to manage modifications of data corresponding to the third subset.

* * * * *